United States Patent
Jarjoui et al.

(10) Patent No.: US 11,394,561 B2
(45) Date of Patent: *Jul. 19, 2022

(54) DIGITAL TRANSACTION SIGNING FOR MULTIPLE CLIENT DEVICES USING SECURED ENCRYPTED PRIVATE KEYS

(71) Applicant: OX Labs Inc., Los Angeles, CA (US)

(72) Inventors: Wissam Jarjoui, San Francisco, CA (US); George Melika, Los Angeles, CA (US); Akbar Thobhani, South San Francisco, CA (US)

( * ) Notice: Subject to any disclaimer, the term of this patent is extended or adjusted under 35 U.S.C. 154(b) by 99 days.

This patent is subject to a terminal disclaimer.

(21) Appl. No.: 16/917,885

(22) Filed: Jun. 30, 2020

(65) Prior Publication Data

US 2021/0051022 A1 Feb. 18, 2021

Related U.S. Application Data

(63) Continuation of application No. 16/683,246, filed on Nov. 13, 2019, now Pat. No. 10,742,422, which is a
(Continued)

(51) Int. Cl.
*H04L 9/32* (2006.01)
*H04L 9/08* (2006.01)
(Continued)

(52) U.S. Cl.
CPC ......... *H04L 9/3247* (2013.01); *G06Q 20/065* (2013.01); *G06Q 20/367* (2013.01);
(Continued)

(58) Field of Classification Search
CPC ... H04L 9/3247; H04L 9/0631; H04L 9/0822; H04L 9/0825; H04L 9/0827; H04L 9/085;
(Continued)

(56) References Cited

U.S. PATENT DOCUMENTS 5,872,849 A   2/1999 Sudia
10,742,422 B1* 8/2020 Jarjoui ............... H04L 9/0825
(Continued)

OTHER PUBLICATIONS

Nandakumar et al., "Secure One-time Biometric Tokens for Non-repudiable Multi-party Transactions", Dec. 2017, IEEE, pp. 1-6. (Year: 2017).*

(Continued)

*Primary Examiner* — Matthew Smithers
(74) *Attorney, Agent, or Firm* — Cognition IP, P.C.; Edward Steakley; Saleh Kaihani

(57) ABSTRACT

Methods, systems, and apparatus, including computer programs encoded on computer storage media, for signing digital transactions from multiple client devices using secured encrypted private keys associated with electronic accounts. One of the operations is performed by storing multiple encrypted private keys in a memory cache accessible by a primary device. Each of the stored encrypted private keys are associated with an electronic account. An electronic transaction which is associated with an electronic account is received from a secondary device. A particular encrypted private key from the stored multiple encrypted private keys is identified. The identified encrypted private key is transmitted to a decrypting service where the encrypted private key is decrypted. The electronic transaction is then digitally signed based on the unencrypted private key. Then the digitally signed electronic transaction is transmitted to the requesting secondary device.

18 Claims, 13 Drawing Sheets

Related U.S. Application Data continuation of application No. 16/681,793, filed on Nov. 12, 2019, now Pat. No. 11,233,658.

(60) Provisional application No. 62/886,501, filed on Aug. 14, 2019.

(51) Int. Cl.
  *H04L 9/06* (2006.01)
  *G06Q 20/06* (2012.01)
  *G06Q 20/36* (2012.01)

(52) U.S. Cl.
  CPC ............ *H04L 9/0631* (2013.01); *H04L 9/085* (2013.01); *H04L 9/0822* (2013.01); *H04L 9/0825* (2013.01); *H04L 9/0827* (2013.01); *H04L 9/0894* (2013.01); *H04L 2209/56* (2013.01)

(58) Field of Classification Search
  CPC ............... H04L 9/0894; H04L 2209/56; H04L 2209/38; H04L 9/3239; G06Q 20/065; G06Q 20/367; G06Q 20/3825; G06Q 20/3829
  See application file for complete search history.

(56) References Cited

U.S. PATENT DOCUMENTS

| | | | |
|---|---|---|---|
| 2002/0049670 | A1 | 4/2002 | Moritsu et al. |
| 2005/0235148 | A1 | 10/2005 | Scheidt et al. |
| 2010/0115270 | A1 | 5/2010 | Silverbrook et al. |
| 2012/0150742 | A1 | 6/2012 | Poon et al. |
| 2014/0359758 | A1 | 12/2014 | Lee et al. |
| 2015/0006403 | A1 | 1/2015 | Shear et al. |
| 2015/0304736 | A1 | 10/2015 | Lal et al. |
| 2015/0324789 | A1 | 11/2015 | Dvorak et al. |
| 2016/0085955 | A1* | 3/2016 | Lerner .................. G06F 21/725 726/20 |
| 2016/0196533 | A1 | 7/2016 | Naveh et al. |
| 2016/0342976 | A1 | 11/2016 | Davis et al. |
| 2017/0017955 | A1 | 1/2017 | Stern et al. |
| 2017/0109744 | A1 | 4/2017 | Wilkins et al. |
| 2017/0352012 | A1 | 12/2017 | Hearn et al. |
| 2018/0060860 | A1 | 3/2018 | Tian et al. |
| 2018/0247191 | A1 | 8/2018 | Katz et al. |
| 2018/0316492 | A1 | 11/2018 | Ramachandran et al. |
| 2018/0367316 | A1 | 12/2018 | Cheng et al. |
| 2019/0007205 | A1 | 1/2019 | Corduan et al. |
| 2019/0034919 | A1* | 1/2019 | Nolan .................... H04L 9/3239 |
| 2019/0220859 | A1* | 7/2019 | Weight ................. G06Q 20/381 |
| 2019/0280864 | A1 | 9/2019 | Cheng et al. |
| 2019/0295069 | A1 | 9/2019 | Pala et al. |
| 2019/0342080 | A1 | 11/2019 | Vakili et al. |
| 2019/0354970 | A1* | 11/2019 | Di Iorio ............. G06Q 20/3823 |
| 2019/0354972 | A1 | 11/2019 | Di Nicola |
| 2020/0119908 | A1 | 4/2020 | Christensen et al. |

OTHER PUBLICATIONS

Singh et al., "Blockchain: Future of Financial and Cyber Security", 2016, IEEE, pp. 463-467. (Year: 2016).*
Office Action in U.S. Appl. No. 16/681,793, dated Feb. 13, 2020.
Kouta et al., "Secure e-Payment using Multi-agent Architecture," Proceedings of the 30th Annual International Computer Software and Applications Conference (COMPSAC'06) pp. 1-6, 2006.
International Search Report in PCT International Application No. PCT/US20/46037, dated Nov. 18, 2020.

* cited by examiner

DIGITAL TRANSACTION SIGNING FOR MULTIPLE CLIENT DEVICES USING SECURED ENCRYPTED PRIVATE KEYS

CROSS-REFERENCE TO RELATED APPLICATIONS

This application is a continuation of U.S. application Ser. No. 16/683,246 filed Nov. 13, 2019, which is a continuation of U.S. application Ser. No. 16/681,793, filed Nov. 12, 2019, which claims the benefit of U.S. Provisional Application No. 62/886,501, filed Aug. 14, 2019, all of which are hereby incorporated by reference in their entirety.

BACKGROUND

Digital signing allows validation and authentication of electronic data and electronic transactions. A signatory has a public and private key pair where the public key is publicly distributed to other persons and systems and the private key is maintained in secret and not shared with others. Digital signatures may be generated in conjunction with the use of the private key with verification of the signature using the corresponding public key. A properly signed digital signature provides a receiving person or a receiving system confirmation that the signed electronic data was indeed originated by the sender or system owning the private key. Also, a public key crypto scheme may be used to encrypt sensitive data such that only the holder of the private key has access to that data. In the case of crypto currency, a private key may also be used to limit access to electronic wallets where the crypto currency is stored. The electronic wallet will only release the crypto currency once the wallet verifies a withdrawal request is digitally signed by the owner of the private key. It is therefore critical to safeguard the private key and protect it so that the private key is not compromised. Large distributed systems handling private keys, however, are often inadequate in protecting private keys from administrators of such systems.

SUMMARY

Described herein is an exemplary system for digital transaction signing for multiple client devices using secured encrypted private keys. The system encrypts and stores private keys in a secured manner to prevent administrators of the system from accessing private key information. The system provides a mechanism to create, manage and store private keys in such a way that no single user (or minority group of users) has access to unencrypted private keys. The system also provides a mechanism to distribute private keys across different geographies using distributed servers for secured storage of the private keys. Additionally, the system provides a mechanism for the creation and signing of electronic transactions using the stored private keys.

In general, one innovative aspect of the subject described in this specification can be embodied in systems, computer readable media, and methods that include operations for digital transaction signing for multiple client devices using secured encrypted private keys. One of the operations is performed by storing multiple encrypted private keys in a memory cache accessible by a primary device and decrypting the private keys as needed. Each of the stored encrypted private keys are associated with an electronic account. An electronic transaction which is associated with an electronic account is received from a secondary device. A particular encrypted private key from the stored multiple encrypted private keys is identified. The identified encrypted private key is transmitted to a decrypting service where the encrypted private key is unencrypted. The electronic transaction is then digitally signed based on the unencrypted private key, and the digitally signed electronic transaction is transmitted to the requesting secondary device. The transactions and transfer of data among devices ideally should be performed over private and/or secured networks. Further areas of applicability of the present disclosure will become apparent from the detailed description, the claims and the drawings. The detailed description and specific examples are intended for illustration only and are not intended to limit the scope of the disclosure.

In general, another innovative aspect of the subject described in this specification can be embodied in systems, computer readable media, and methods that include operations for digital transaction signing with a hardware device using secured encrypted private keys. One of the operations is performed by the hardware device generating a private key and public key pair. The private and public key pair is associated with an electronic wallet or account. The hardware device has its own associated private and public key pair. The hardware device generates multiple key shares of the private key associated with the electronic account. The hardware device uses a technique such as Shamir's secret sharing to divide the private key associated with the account into a predetermined number of key shares. A quorum of the total number of key shares will later be required by the hardware device to reconstruct the private key associated with the electronic account. The hardware device encrypts each of the multiple key shares with a public key associated with the hardware device, thereby creating multiple first encrypted key shares. Later, the private key of the hardware device is needed to decrypt (i.e., unlock) the multiple first encrypted key shares. The hardware device encrypts each of the multiple first encrypted key shares with separate user public keys, thereby creating multiple second encrypted key shares. The multiple second encrypted key shares are obtained from the device and distributed to the respective users associated with the separate user public keys. The system transmits transaction data to two or more of the respective users for their approval. Ideally, the system does not provide information to a user of which users have received the transaction data. The system signs the transaction data with a public key associated with the hardware device. The system receives credential information from the respective users and decrypts, using the user's private key, the second encrypted key shares to generate the first encrypted key shares. In this embodiment, the system receives the credential information via a client user interface or alternatively using the users trusted software to decrypt. The credential information does not reach the services and or other servers of the system. The system generates a transaction packet including a copy of the signed transaction data and the first encrypted key share. The system encrypts the transaction packet for each of the respective users with the public key associated with the device. Doing so then allows only the private key associated with the device to decrypt the transaction packets.

The hardware device then receives a copy of two or more encrypted transaction packets. Each of the transaction packets include different first encrypted key shares of the respective users. The hardware device, using the device private key, decrypts each of the two or more encrypted transaction packets, thereby generating two or more unencrypted key shares. The hardware device then generates a reconstructed private key associated with the electronic account based on the two or more unencrypted key shares. The hardware device requires a minimum number of key shares from the total originally generated key shares to reconstruct the private key. After the private key is reconstructed, then the hardware device may digitally sign the transaction with the reconstructed private key to approve the transaction. The digitally signed transaction may then be transmitted or broadcasted to a block-chain network.

As will be described below, the system divides a wallet private key into multiple key shares that are then used to reconstruct the wallet private key. By using key shares to start ensures that no single user or entity has control over an electronic wallet. The system provides an inner layer and an outer layer of encryption for the multiple key shares of the wallet private key. For the inner layer (i.e., a first layer) of encryption, the system uses an offline device public key to encrypt each of the multiple key shares. The inner layer of encryption ensures that only the offline device with its private key can decrypt the inner layer of encryption of the multiple key shares. Also, the use of the inner layer of encryption for the key shares ensures that the electronic wallet can only be reconstructed by the offline device using its private key. For the outer layer (i.e., a second layer) of encryption, the system uses a public key for the respective users that are to receive the encrypted key shares. The outer layer of encryption ensures that no one other than the holder of a user private key will have access to the single-encrypted wallet key share. Additionally, the system may use a public key of an intermediary service to transmit approved transactions for distribution to a crypto-currency network. This ensures that approved transactions are encrypted and may only be decrypted by the service that is broadcasting an approved transaction.

BRIEF DESCRIPTION OF THE DRAWINGS

The present disclosure will become better understood from the detailed description and the drawings, wherein.

DETAILED DESCRIPTION

Figure 1:
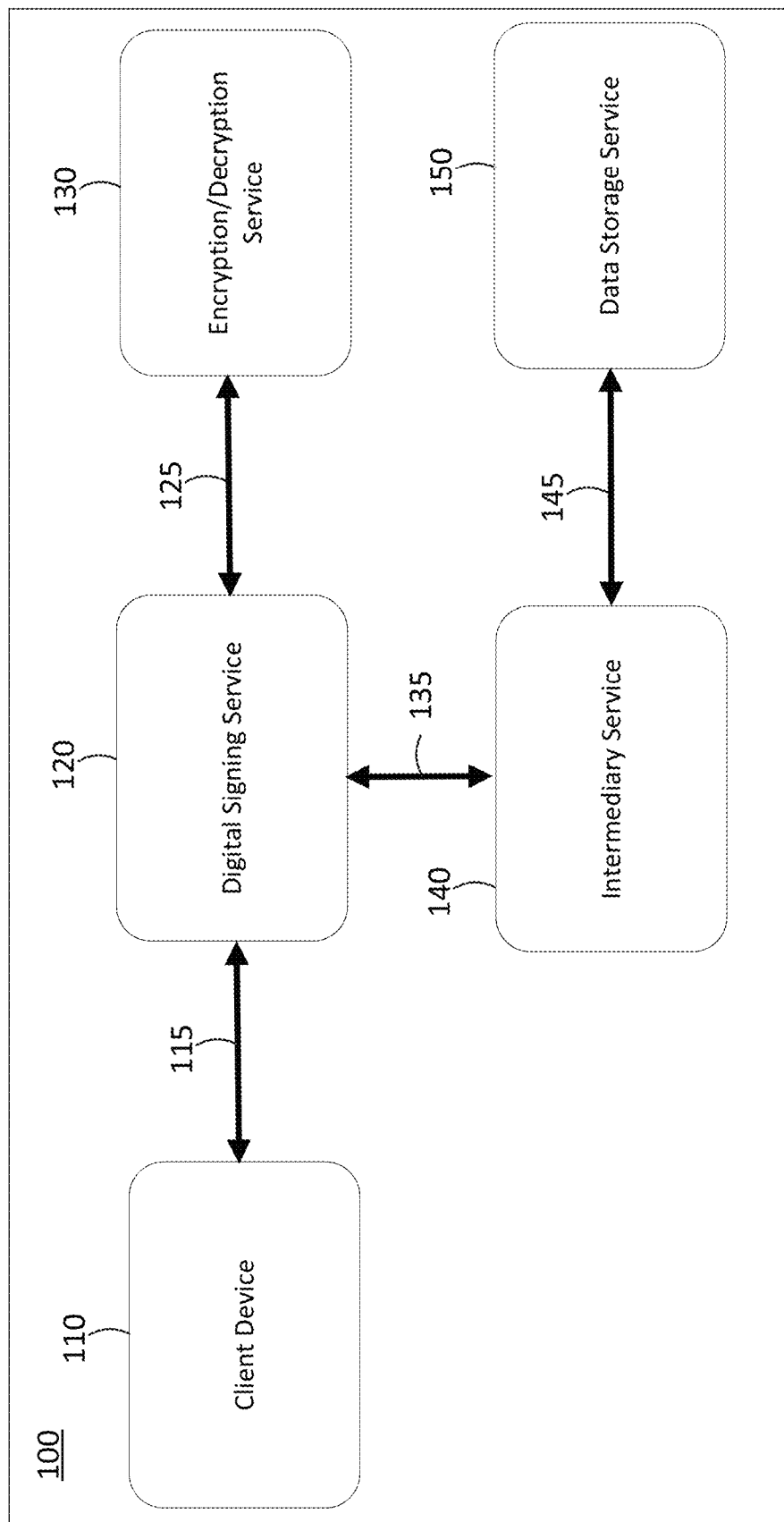
FIG. 1 illustrates an example system architecture for signing digital transactions using secured encrypted private keys.

In this specification, reference is made in detail to specific embodiments of the invention. Some of the embodiments or their aspects are illustrated in the drawings.

For clarity in explanation, the invention has been described with reference to specific embodiments, however it should be understood that the invention is not limited to the described embodiments. On the contrary, the invention covers alternatives, modifications, and equivalents as may be included within its scope as defined by any patent claims. The following embodiments of the invention are set forth without any loss of generality to, and without imposing limitations on, the claimed invention. In the following description, specific details are set forth in order to provide a thorough understanding of the present invention. The present invention may be practiced without some or all of these specific details. In addition, well known features may not have been described in detail to avoid unnecessarily obscuring the invention.

In addition, it should be understood that steps of the exemplary methods set forth in this exemplary patent can be performed in different orders than the order presented in this specification. Furthermore, some steps of the exemplary methods may be performed in parallel rather than being performed sequentially. Also, the steps of the exemplary methods may be performed in a network environment in which some steps are performed by different computers in the networked environment.

Some embodiments are implemented by a computer system. A computer system may include a processor, a memory, and a non-transitory computer-readable medium. The memory and non-transitory medium may store instructions for performing methods and steps described herein.

FIG. 1 illustrates an example system architecture for signing digital transactions using secured encrypted private keys. One or more client devices 110 (e.g., a workstation, laptop, server, mobile phone, tablet device) runs software, services or applications that generate public key/private key pairs for use in public key and private key encrypted transactions. Generally, a public key is known or provided to many people, whereas a private key is kept secret. The public key is used to encrypt data and only the private key can "unlock" and decrypt the data using the private key. For example, in the context of crypto-currency transactions such as Bitcoin, an application (e.g., a wallet) initially creates a public and private key pair. The owner of the wallet distributes the public key to others so that the owner of the wallet may receive transactions to receive transfers of crypto currency to the owners account.

The wallet randomly generates a private key of a 256-bit number and typically represented in 32 bytes as a hexadecimal number, or as 64 bytes in the range of 0-9 or A-F. The public key is mathematically derived from the private key. The public key (a.k.a. bitcoin address) is an identifier of 26-35 alphanumeric characters beginning with the number 1 or 3 that represents a possible destination for a bitcoin transfer. The wallet also stores a log of incoming and outgoing transfers of crypto-currency. The wallets may perform funds transfers for any type of currency that uses public key signing (e.g., for authorization and authentication), such as the following crypto-currency types: Bitcoin (BTC), Litecoin (LTC), Ethereum (ETH), Ripple (XRP), Bitcoin Cash (BCH), Monero (XMR), Zcash (ZEC), Dash (DASH) NEO (NEO), Cardano (ADA) and EOS (EOS).

In an alternative embodiment, the digital signing service 120 may generate a public/private key pair. The digital signing service may receive a request from the client device 110 or from the intermediary service 140 to create a new public/private key pair. In this embodiment, the wallet would not have direct access to an unencrypted private key. The newly generated private key is encrypted as described below. The digital signing service 120 may return the public key to the client device 110 and/or to the intermediary service 140.

Referring to FIG. 1, the client device 110 receives or generates a request for a transaction to transfer crypto-currency (e.g., electronic currency) for a particular user's wallet. For example, a request may be received or generated to transfer electronic funds from one bitcoin address to another bitcoin address. Additionally, the user may initiate a request to transfer funds from their wallet to another bitcoin address. Users owning a wallet must separately provide a password and/or pin to access their respective wallets. Additionally, the system 100 may require an additional 2-factor authentication for the users (e.g., by providing an SMS text message with a passcode, or push notification to a device of the user with a passcode) where the user must additionally enter a received passcode to access their wallet and be able to submit transfer requests.

The wallet application creates an unsigned transaction (e.g., an unsigned bitcoin transaction) related to the electronic account for the user's wallet. In one embodiment, user electronic accounts may be organized by the system 100 where the user electronic account is one of many sub-accounts of a master account. The master account is an electronic account configured to own all of the crypto-currency for the sub-accounts. Each of the sub-accounts own a portion of the total amount held in the master account. The system 100 may generate a master private key for the master account and generate private keys (e.g., sub-keys) for the sub-accounts. The private keys may be derived from the master private key.

The client device 110 communicates, via communications network 115, with the digital signing service 120. The digital signing service 120 communicates, via communications network 125, with the encryption/decryption service 130. The digital signing service 120 communicates, via communications network 135, with the intermediary service 140. The intermediary service 140 communicates, via communications network 145, with the data storage service 150. As used herein a communications network 115, 125, 135, 145 may be an electronic network (e.g., any one of a local area network, wide area network, the Internet or an intranet) providing for the receiving and transmission of data among devices. In one embodiment, the communication networks 115, 125, 135, 145 are TCP/IP based networks where data is transmitted using transport layer security (TLS) so that data transmissions are encrypted on the communications network 115, 125, 135, 145. Additionally, the system 100 may use a private encrypted network for connections over the communications network 115, 125, 135, 145 among servers, devices and/or services and applications. While the system 100 is shown in FIG. 1 in a distributed architecture with different services performed on different servers, the services may be combined and/or further distributed into additional services or functionality.

The wallet application generates an electronic transaction (e.g., transfer of funds from the account) for a particular electronic account and submits the transaction to the digital signing service 120 for digital signing. The system 100 may first perform validation checks to determine whether the transaction is an approved transaction (e.g., determining if the value of the transaction exceeds a predetermined threshold amount for a transaction, determining if the account exceeds a predetermined number of transactions and/or predetermined number of transactions within a time period, such a number of hours, days, weeks, months.) If the transaction is not approved, then the system 100 will flag the transaction, and will not proceed with signing of the transaction. The system 100 may optionally perform a validation operation to determine whether the public address to which the funds are being transferred to is on an approved list (e.g., a public address white list). If the system 100 determines that the public address is on the approved list (e.g., a list of public addresses stored in memory accessible by the system 100), then the digital signing service 120 receives the electronic transaction for digital signing. Once the transaction is signed, the wallet application may then broadcast the electronic transaction, for example to a bitcoin block chain.

Figure 2:
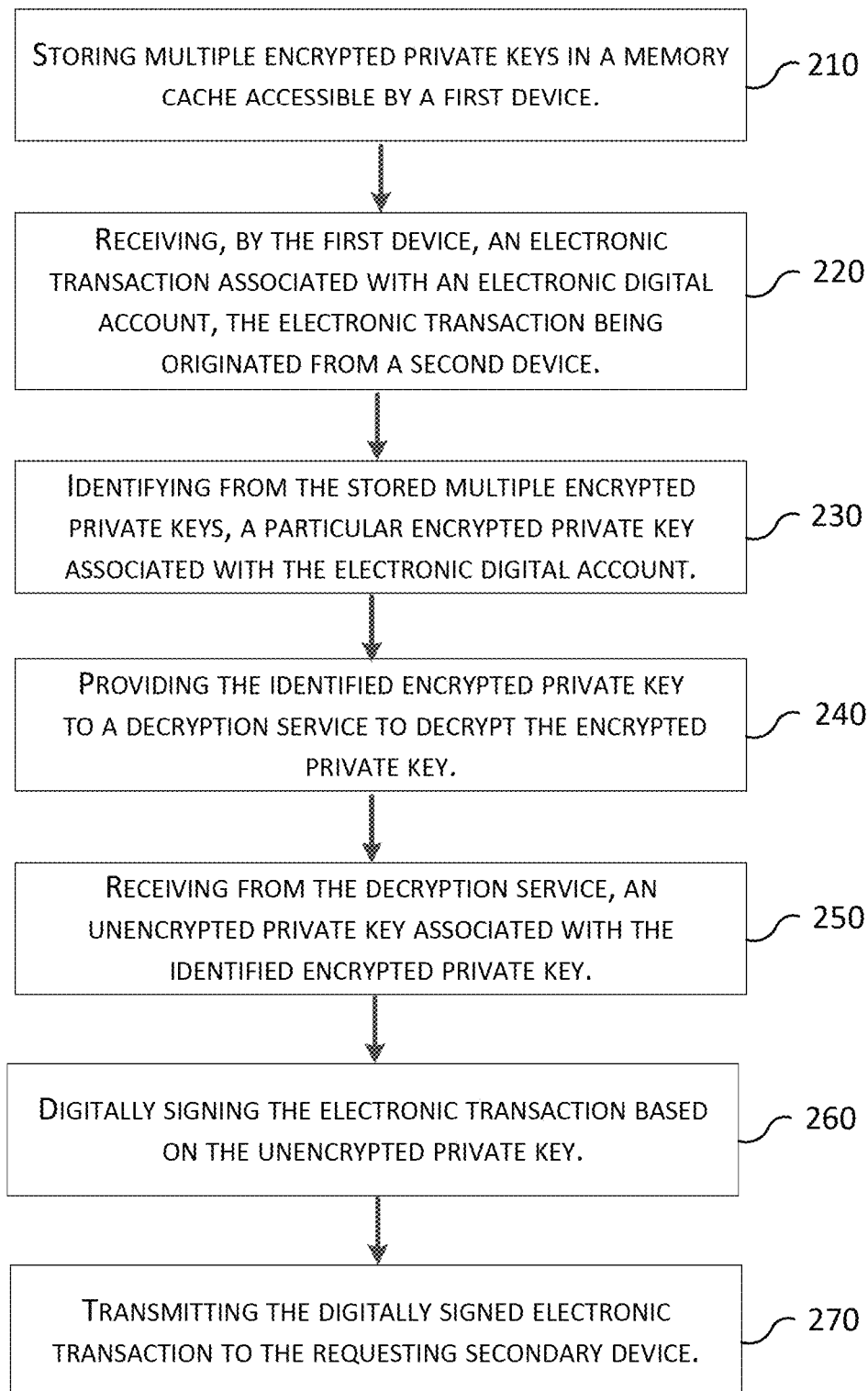
FIG. 2 illustrates a flowchart of an example process for signing digital transactions using secured encrypted private keys.

FIG. 2 illustrates a flowchart of an example process for signing digital transactions using secured encrypted private keys. The digital signing service 120 receives a set of encrypted private keys that may have been stored in and received from a data storage service 150 as described below. The digital signing service 120 stores the multiple encrypted private keys in a data storage device (e.g., a non-persistent memory cache in random access memory) accessible by the digital signing service (block 210). Each of the multiple encrypted private keys may have an associated index value which is also stored in the memory cache. The digital signing service 120 uses the index value to perform lookups (e.g., via a lookup table in the memory cache) and identifies a particular encrypted private key associated with the index value. For example, the value of the index may be the associated the public key pair of the private key, an account number of the electronic account, a hash value of the account number, or any other suitable identifier that uniquely identifies the electronic account.

The digital signing service 120 receives from a client device 110 an electronic transaction associated with an electronic account (block 220). The digital signing service provides an application program interface (API) for receiving transactions and requests from the client devices 110. For example, the client device 110 may submit to the digital signing service 120 a request to authenticate an electronic transaction for an outgoing transfer of electronic currency from the electronic account. The digital signing service 120 converts a value of the electronic account to an index value, or obtains a public key associated with the electronic account and used the value of the public key as the index value. The digital signing service 120 then identifies a respective encrypted private key corresponding to the index value (block 230).

The digital signing service 120 securely provides (e.g., transmits), via communications network 125, the identified encrypted private key from the digital signing service 120 to an encryption/decryption service 130 (block 240). The digital signing service 120 stores in the memory cache a cryptographic key used specifically with the encryption/decryption service 130 for encrypting and decrypting data sent to the encryption/decryption service 130. The encryption/decryption service 130 may decrypt the encrypted private key using one or more encryption/decryption standards (e.g., AES 128-bit, 192-bit, 256-bit; 3DES; Twofish 128-bit to 256-bit; RSA 1024-bit, 2048-bit). The encryption/decryption service 130 decrypts the encrypted private key and transmits, via the communications network 125, the decrypted private key to digital signing service 120.

In one embodiment, the encryption/decryption service 130 is a Hardware Security Model (HSM) encryption/decryption service which provides a tamper-resistant hardware architecture that allows cryptographic operations (encryption, decryption) while keeping the cryptographic key within its hardware boundary. For example, the encryption/decryption service 130 may be a cloud-based server service which is a managed hardware security model on the cloud-based service.

In one embodiment, the digital signing service 120 receives the unencrypted private key from the encryption/decryption service via communications network 125 (block 250). The digital signing service 120 uses the unencrypted private key to digitally sign the electronic transaction (block 260). In another embodiment, the digital signing service 120 and the encryption/decryption service 130 may be combined into a single service that performs both encryption/decryption of encrypted private keys and signing of the electronic transaction. In this embodiment, a decrypted private key is not returned or transmitted over a communications network or to any other service or device. In such an embodiment, the combined services 120 and 130 may expose an encrypted private key for backup purposes. The encrypted private key may be backed up using the data storage service 150.

The digital signing service 120 generates a digital signature which provides validation and authentication of the electronic transactions. The digital signature is generated in conjunction with the use of the unencrypted private key. The digital signature may be later verified using the corresponding public key. In one embodiment, the digital signature is a mathematical scheme for presenting the authenticity of electronic transactions, messages or documents. For example, the digital signing service 120 may create a one-way hash of the electronic transaction using the private key to encrypt the hash using an asymmetric cryptographic technique. Each signed electronic transaction would have a different digital signature based on the unencrypted private key used to sign the electronic transaction.

The digital signing service 120 wipes from the memory cache and/or any other data storage devices all instances of the unencrypted private key and may do so immediately after digitally signing the electronic transaction. The wipe may be performed within 10 ms, 100 ms, 1 second, 1 minute, 10 minutes, 1 hour, or other intervals of the digitally signing of the electronic transaction. The digital signing service 120 then transmits, via communications network 115, to the requesting client device (block 270) the signed digital transaction. The signed electronic transaction may be later verified as originating from the private key by decrypting the signed electronic transaction with a public key corresponding to the private key. An electronic wallet then may broadcast the electronic transaction, for example to a bitcoin block chain.

Figure 3:
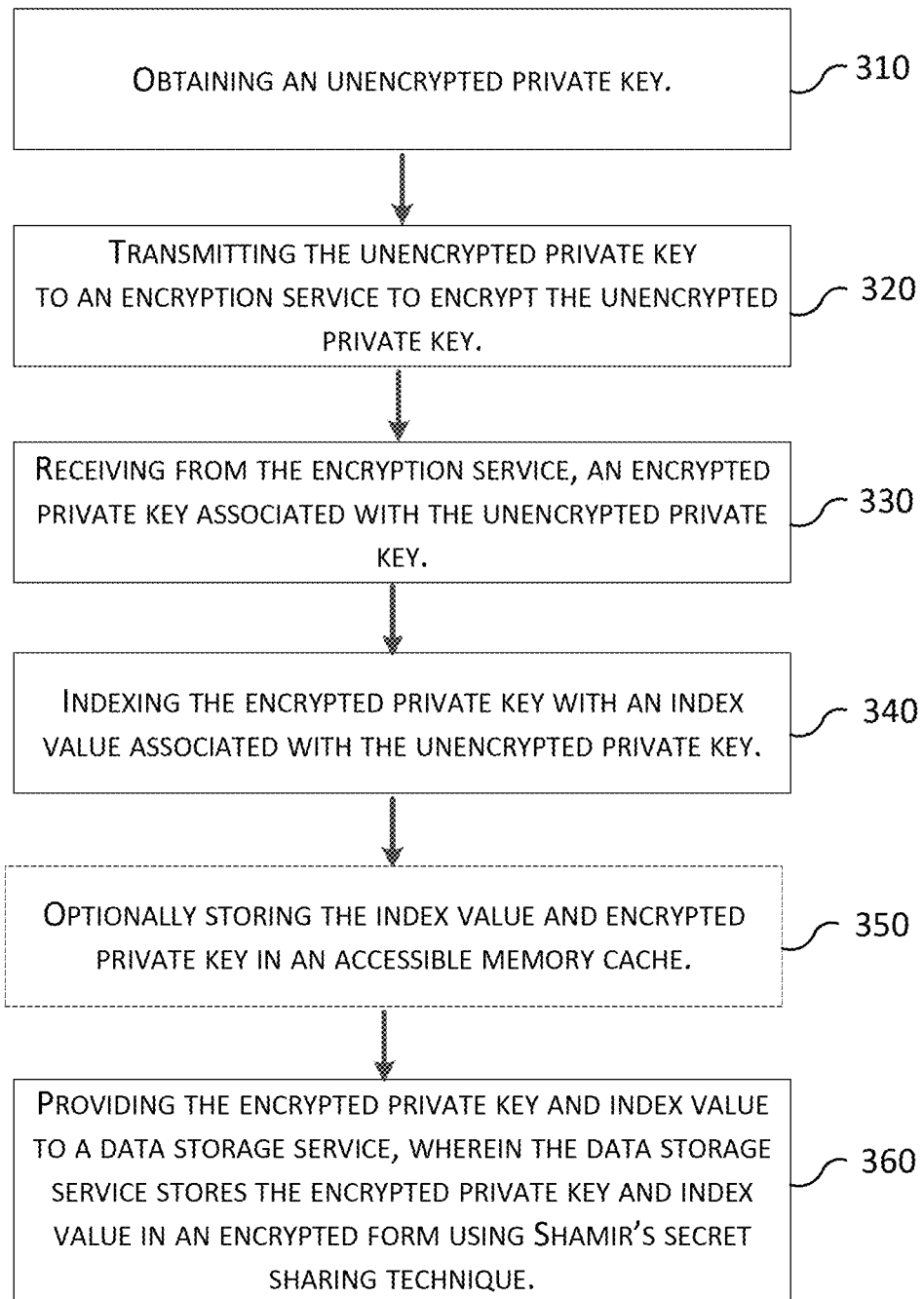
FIG. 3 illustrates a flowchart of an example process for receiving an unencrypted private key, encrypting the unencrypted private key and storing the encrypted private key in a data storage service.

FIG. 3 illustrates a flowchart of an example process for obtaining an unencrypted private key, encrypting the unencrypted private key and storing the encrypted private key in a data storage service 150. The digital signing service 310 obtains an unencrypted private key pair (block 310). In one embodiment, the client device 110 securely transmits over the communications network 115 and the digital signing service 120 receives an unencrypted private key from the client device 110. In another embodiment, the digital signing service 120 may receive an instruction or command to generate both the public key and its associated unencrypted private key pair. For example, the client device 110 may request a new public/private key pair be generated, or the intermediary service 140 may request that a new public/private key pair be generated. In response to the request, the digital signing service 120, then would generate a new public/private key pair.

The digital signing service 120 securely transmits, via communications network 125, the unencrypted private key from the digital signing service 120 to an encryption/decryption service 130 (block 320). The encryption/decryption service 130 may encrypt the unencrypted private key using one or more encryption/decryption standards (e.g., AES 128-bit, 192-bit, 256-bit; 3DES; Twofish 128-bit to 256-bit; RSA 1024-bit, 2048-bit). The encryption/decryption service 130 encrypts the unencrypted private key and transmits, via the communications network 125, the encrypted private key to digital signing service 120 (block 330). The encryption/decryption service 130 thus provides a first layer of encryption for the private keys.

The encrypted private key and the unencrypted public key pair is securely transmitted, via communications network 135, by the digital signing service 120 to the intermediary service 140. The intermediary service 140 then interacts with the data storage service 150 (as described below) to store the encrypted private key and the unencrypted public key in another layer of encryption.

In one embodiment, the digital signing service 120 is a service operating on one or more servers that are physically distinct and separate from servers used for the encryption/decryption service 130, the intermediary service 140 and the data storage service 150. In another embodiment, the functionality and the processing of the digital signing service 120 may operate on the same servers and/or be combined with the encryption/decryption service 130, the intermediary service 140, and/or the data storage service 150.

In one embodiment, after generation of a new encrypted private key, the digital signing service 120 indexes (e.g., associates) the obtained encrypted private key to an index value that corresponds to the unencrypted private key (block 340). In other embodiment, the system 100 may index the encrypted private key later via a request made by the intermediary service 140. For example, the index value may be the value of the public key pair, an account number of the electronic account, a hash value of the account number, or any other suitable identifier that uniquely identifies the public key pair and/or the electronic account. The digital signing service 120 may optionally store the received encrypted private key and the index value in a non-persistent memory cache accessible by the digital signing service (block 350). After encrypting the unencrypted private key, the digital signing service 120 wipes from memory and/or any other storage all data of the unencrypted private key.

The digital signing service 120 transmits the index value and encrypted private key, via communications network 135, to an intermediary service 135, that in turn interacts, via communications network 145, with the data storage service 150. The intermediary service 135 provides an intermediary layer of security distancing the digital signing service 120 from the data storage service 150. For example, administrators of the digital signing service 120, intermediary service 140 and data storage 150 service would be different users whose identity should be maintained in secret as to the other users. The data storage service 150 stores the encrypted private key and its associated index value as described below.

In addition to receiving the unencrypted private key, the digital signing service 120 may receive from a client device 110 additional data associated with the electronic account (e.g., previous electronic transactions with date stamps indicating fund transfers to/from the electronic account, the public key associated with the unencrypted private key, balances of electronic currency for the electronic account, account owner information such as name, address, and/or phone numbers.) The digital signing service 120 similarly may provide the associated account data along with the unencrypted private key to the encryption/decryption service 130 to encrypt the associated account data along with the unencrypted private key. The encrypted private key, the encrypted associated account data and the electronic account index identifier may then be sent to the data storage service 150 for encrypted storage thereof. This process allows the system 100 to make a back-up copy of the contents of a user's wallet.

Figure 4:
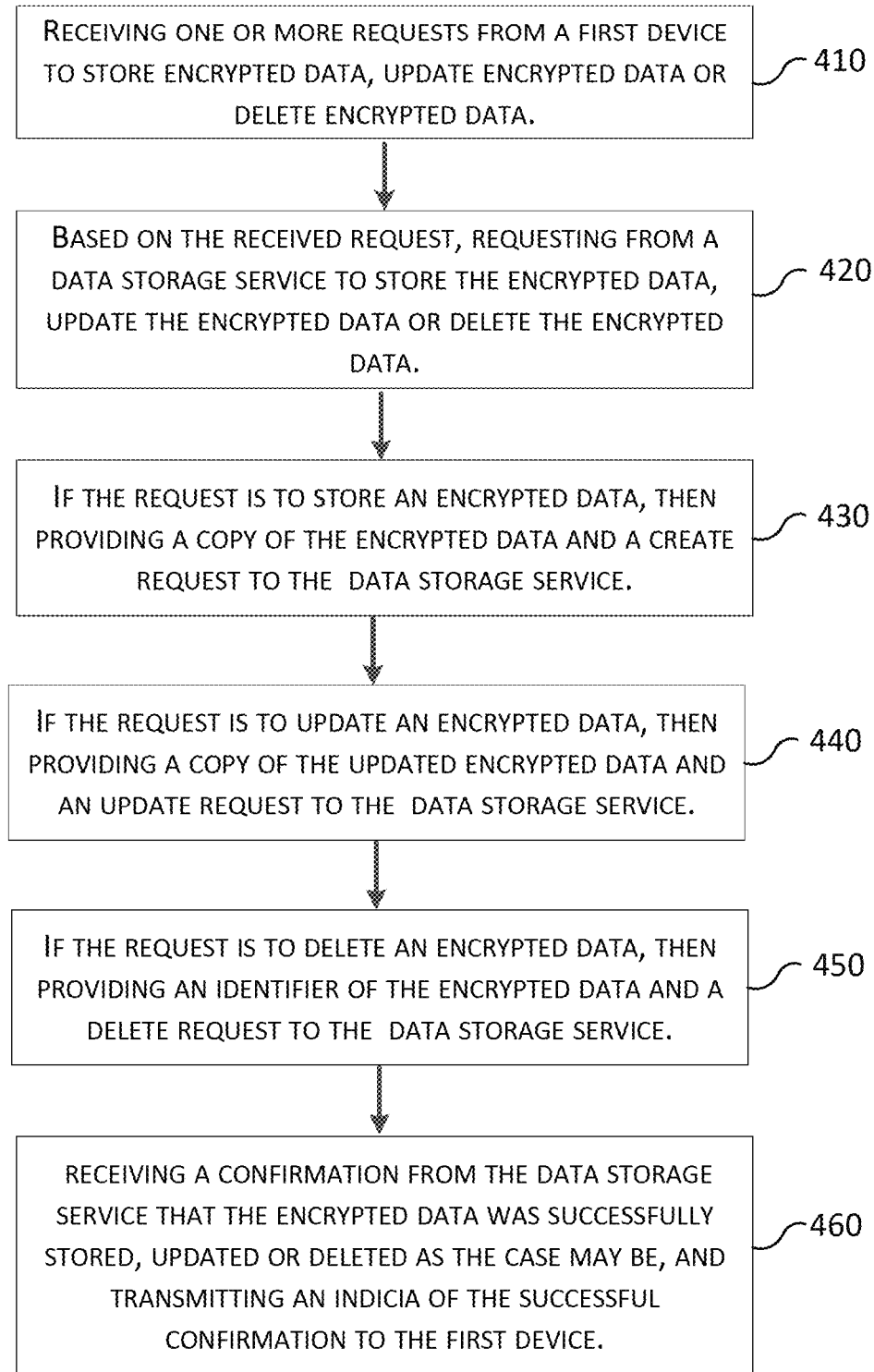
FIG. 4 illustrates a flowchart of an example process for an intermediary service to manage requests for storing, deleting or updating encrypted data stored on the data storage service.

FIG. 4 illustrates a flowchart of an example process for an intermediary service 140 to manage requests for storing, deleting or updating encrypted data stored by the data storage service 150. The intermediary service 140 interacts with the digital signing service 120 via communications network 135 and with the data storage service 150 via communications network 145. In one embodiment, the intermediary service 140 is a service operating on one or more servers that are physically distinct and separate from servers used for the digital signing service 120, the encryption/decryption service 130 and the data storage service 150. In another embodiment, the functionality and the processing of the intermediary service 140 may operate on the same servers and/or be combined with the digital signing service 120, the encryption/decryption service 130, and/or the data storage service 150.

The intermediary service 140 is configured to initiate commands and requests to and interact with the digital signing service 120 and the data storage service 150. In one embodiment, the intermediary service 140 is configured to handle and process requests related to the storage, retrieval, modification and deletion of encrypted data (e.g., the encrypted private key and/or encrypted associated account data) from the data storage service 150 (block 410). For example, an administrative user may access the intermediary service 140 and request storage, retrieval, modification and/or deletion of encrypted data from the data storage service 150.

Based on the particular request received, the intermediary service 140 in turn requests from the data storage service 150 to store encrypted data, update previously stored encrypted data or to delete previously stored encrypted data managed by the data storage service 150 (block 420).

In the case of a newly created encrypted private key, a request is made, via the intermediary service 140 to store the newly created encrypted data (e.g., the encrypted private key and/or encrypted associated account data) on the data storage service 150 (block 430). The intermediary service 140 receives from the digital signing service 120 a copy of the encrypted private key. The intermediary service 140 provides a copy of the encrypted data to the data storage service 150. The digital signing service 120 transmits a copy of the encrypted data and associated indices to the intermediary service 140, and/or provides a logical link to a shared memory or storage space where the encrypted data is made available.

In the case of updated encrypted account data, a request is made via the intermediary service 140 to update the previously stored encrypted account data managed by the data storage service 150 (block 440). The intermediary service 140 provides a copy of the updated encrypted account data to the data storage service 150. The digital signing service 120 transmits a copy of the updated encrypted account data and associated indices to the intermediary service 140, and/or provides a logical link to a shared memory or storage space where the updated encrypted account data is made available.

In the case of deleting stored encrypted data, a request is made via the intermediary service 140 to delete previously stored encrypted data managed by the data storage service 150 (block 450). With a deletion request, the intermediary service may receive an identifier (e.g., an index value) of the specific encrypted data to have deleted from the data storage service 150. The intermediary service 140 requests the particularly identified data to be deleted from the data storage service 150.

In any of the cases for creation, updating or deletion of encrypted data, the data storage service 150 provides the intermediary service 110 an indicia (e.g., a positive return code or confirmation) if the encrypted data was successfully stored, updated and/or deleted by the data storage service 150.

Figure 5:
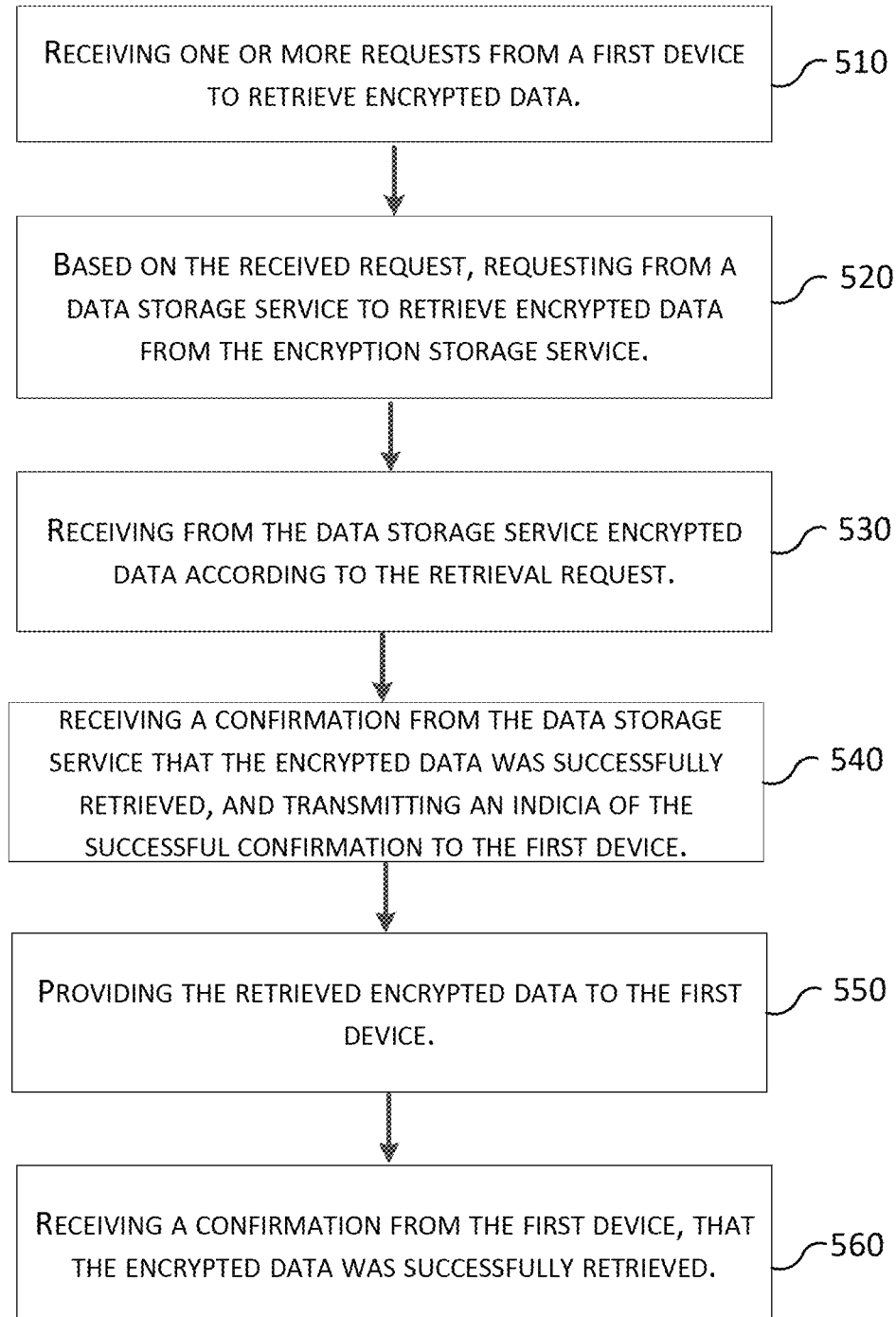
FIG. 5 illustrates a flowchart of an example process for an intermediary service to manage requests for retrieving encrypted data from a data storage service.

FIG. 5 illustrates a flowchart of an example process for an intermediary service 140 to manage requests for retrieving encrypted data from a data storage service 150. In the case of a initializing a memory cache or partially loading encrypted data into the memory cache, the intermediary service 140 receives a request to retrieve encrypted data (e.g., the encrypted private key and/or encrypted associated account data) that is stored by the data storage service 150 (block 510).

Based on the received request, the intermediary service 140 requests from the data storage service 150 to retrieve encrypted data (block 520). The request to retrieve data may include a parameter for a specific encrypted data item (e.g., a particular encrypted private key and/or encrypted associated account data). The request may include a range of particular encrypted data to be retrieved based on one or more parameters (e.g., a date range the encrypted data was created or a date range the encrypted data was last updated). The request may include a parameter to indicate that all stored encrypted data should be retrieved.

After proper data storage service authentication (as further discussed below), the intermediary service 140 receives the requested encrypted data (block 530). The data storage service 150 provides the intermediary service 140 an indicia (e.g., a positive return code or confirmation) if the encrypted data was successfully retrieved by the data storage service 150 (block 540).

The intermediary service 140 may determine that it properly received the encrypted data from the data storage service 150. For example, the data storage service 150 may provide a check sum (e.g., SHA256 or MD5 hash) related to the retrieved encrypted data, and the intermediary service 140 may evaluate the received encrypted data and check sum to confirm that the received encrypted data was received intact.

After receiving the encrypted data, the intermediary service 140 transmits the retrieved encrypted data to the digital signing service 120 (block 550). The digital signing service 120 may confirm that it properly received the encrypted data. For example, the intermediary service 140 may provide a check sum (e.g., SHA256 or MD5 hash), and the digital signing service 120 may evaluate the received encrypted data and check sum to confirm the retrieved encrypted data was received intact. The digital signing service 120 may provide a positive confirmation to the intermediary service 140 that the encrypted data was properly received (block 560). If the data was not properly received, then the intermediary service 140 retransmits the encrypted data to the digital signing service 120. After successfully transmitting the encrypted data to the digital signing service 120, the intermediary service 140 wipes the encrypted data from memory and/or storage devices.

The digital signing service 120 then stores the retrieved encrypted data and associated indexes in a memory cache for digital signing as discussed above with respect to FIG. 1. While the digital signing service 120 stores the retrieved encrypted data in the memory cache, the digital signing service 120 may "age out" stored encrypted data that has not been used in a predetermined time period. For example, the stored encrypted data may include many encrypted private keys for accounts where the accounts have not engaged in an electronic transaction within a time period, such as ninety days. The digital signing service 120 may delete or wipe from the local cache the encrypted private keys related to accounts that have not engaged in any transactions within a predetermined time period. Removing encrypted private keys from the memory cache for inactive electronic accounts provides additional processor efficiency for index lookups for electronic accounts that are more active. If the digital signing service 120 later receives an electronic transaction for a previous inactive account that needs to be signed with the removed encrypted private key from the memory cache, then the digital signing service 120 will request retrieval of the particular encrypted private key related to the electronic account from the intermediary service 140 as discussed above with respect to FIG. 5.

Data Storage Service

The data storage service 150 provides an API which allows the intermediary service 150 to interact with the data storage service to create, retrieve, update or delete data stored by the data storage service. The data storage service 150 provides for double encryption of the encrypted private keys. In one embodiment, the data storage service 150 is configured to encrypt and store, and/or to decrypt and retrieve, an encrypted private key using Shamir's secret sharing technique. Initially, the private keys are encrypted by the encryption/decryption service 130, and then again by the data storage service 150. The data storage service 150 may encrypt the encrypted private keys using one or more encryption/decryption standards (e.g., AES 128-bit, 192-bit, 256-bit; 3DES; Twofish 128-bit to 256-bit; RSA 1024-bit, 2048-bit).

In one embodiment, the data storage service 150 is a service operating on one or more servers that are physically distinct and separate from servers used for the digital signing service 120, the encryption/decryption service 130 and the intermediary service 140. In another embodiment, the functionality and the processing of the data storage service 150 may operate on the same servers and/or be combined with the digital signing service 120, the encryption/decryption service 130, and/or the intermediary service 140.

Figure 6:
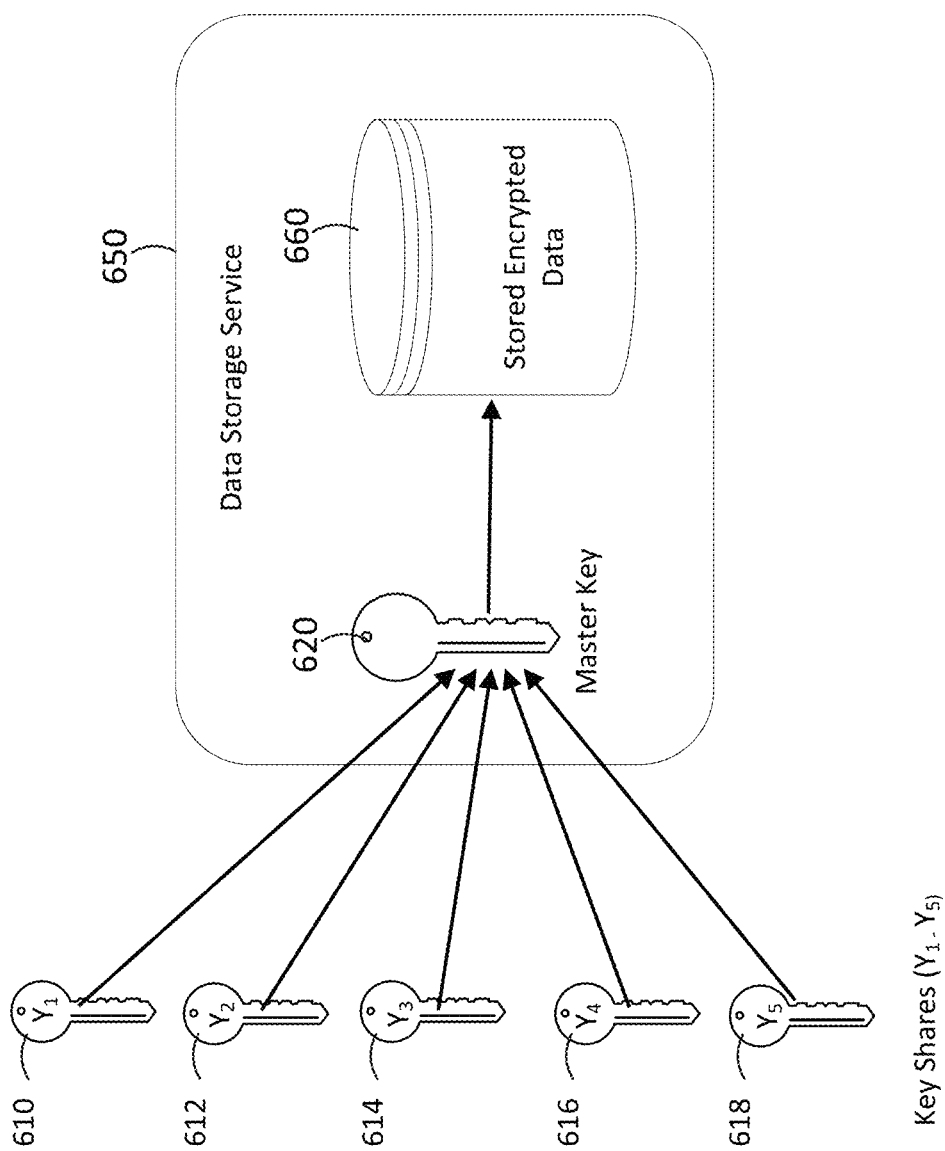
FIG. 6 illustrates an example diagram of the system using Shamir's Secret Sharing technique requiring a quorum of users to access a master key to access and/or store encrypted private keys.

FIG. 6 illustrates an example diagram of the Shamir Secret Sharing technique requiring a quorum of users to access a master key. In one embodiment, the data storage service 150, 650 uses the Shamir Secret sharing technique to allow the data storage service 150, 650 to decrypt the stored encrypted data 660. The data storage service 150, 650 is configured to encrypt and store the encrypted private keys in an encrypted form (i.e., provides a second layer of encryption) in a data storage device and requires at least a predetermined number of private keys shares 610, 612, 614, 616, 618 from a total number of private key shares 610, 612, 614, 616, 618 to decrypt the stored encrypted private keys and/or other encrypted data stored on the data storage device. In other words, the data storage service 150, 650 requires a quorum of y users to "unlock" the encrypted stored data with a master key 620. The data storage service 150, 650 uses a security mechanism where to access or decrypt stored encrypted data 660 (e.g., the second encryption layer of the encrypted private keys), the data storage service 150, 650 would need a minimum (x) of (y) users to unlock the stored encrypted data 660. A master key 620 is divided into y-number of key shares 610, 612, 614, 616, 618. An x-number of key shares are needed to recompute the master key 620 to access or decrypt stored encrypted data 660. The total number of required (x) users, and the total number of (y) users may be configured in the data storage service 150, 650. The data storage 150, 650 service requires a minimum of (x) users to input a token that creates a private key and decrypts and sends the stored contents of the data storage service 150, 650 to the intermediary service 140.

When the data storage service 150, 650 is initialized, the service may provide (y) key shares 610, 612, 614, 616, 618. The key shares 610, 612, 614, 616, 618 may be encrypted via a public/private key encryption scheme (e.g., GPG, PGP, etc.) for each of the y users. The system 100 follows a protocol where the key shares 610, 612, 614, 6164, 618 are distributed to the (y) users such that even an administrative user of the data storage service 150, 650 would not be able to access the private key shares 610, 612, 614, 616, 618 of the (y) users. Each of the users has a public key and corresponding private key which is maintained in secret by each of the (y) users. The public key is used to encrypt the key share 610, 612, 614, 616, 618 of the users and a users respective private key may be used to decrypt their private key share. The private key may be password or pin-protected so that a password or pin is required to decrypt the key share 610, 612, 614, 618.

When a request (e.g., retrieve encrypted data, delete encrypted data, update encrypted data and/or store new encrypted data) is sent from the intermediary service 140 to the data storage service 150, 650, the data storage service notifies the respective (y) users of a request to unseal the stored encrypted data (i.e., to allow the data storage service 150, 160 to perform the requested transaction). At least (x) of the total number (y) users must separately provide a password and/or pin to unlock their private key share 610, 612, 614, 616, 618 and the system 100 provides unlocked private key share 610, 612, 614, 616, 618 to the data storage service 150, 650. Additionally to unseal the stored encrypted data, the system 100 may require an additional 2-factor authentication for the users (e.g., by providing an SMS text message with a passcode, or push notification to a device of the user with a passcode) where the user must additionally enter the passcode to unseal the stored encrypted data with the users respective key shares 610, 612, 614, 616, 618.

Figure 7:
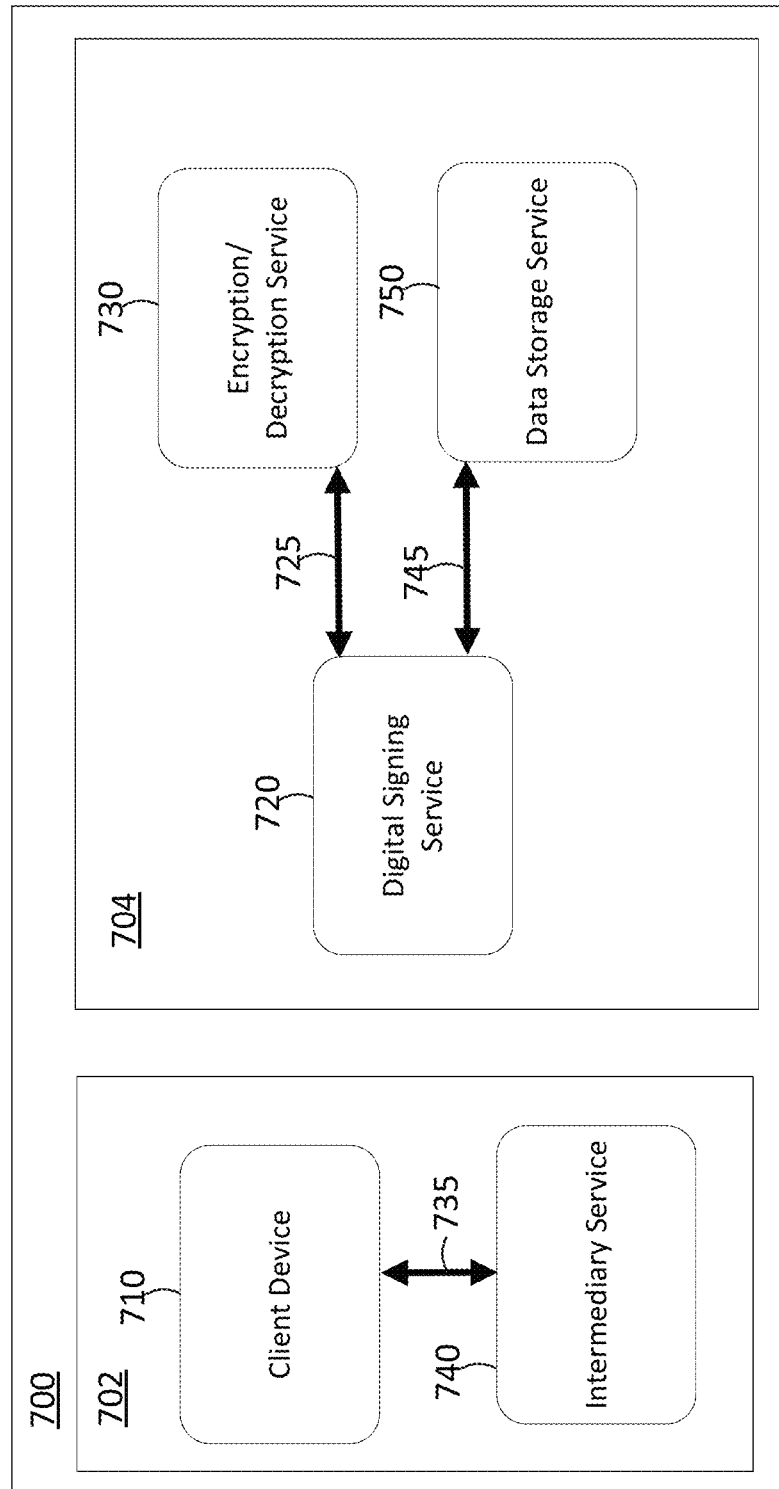
FIG. 7 illustrates an example system architecture for processing digital transactions using secured encrypted private keys.

The specification now discusses another embodiment for processing digital transactions using secured encrypted private keys. FIG. 7 illustrates an example system 700 architecture for processing digital transactions using secured encrypted private keys. The system 700 includes a first sub-system 702 including one or more client devices 710 interconnected via a communications link 735 to an intermediary service 740. The one or more client devices 710 may generate or provide an application having a user interface to allow a user to interact with sub-system 702. The system 700 includes a second sub-system 704 which includes a digital signing service 720 interconnected to an encryption/decryption service 730 via communications link 725 and interconnected to a data storage service 750 via communications link 745. While the second sub-system is depicted with separate devices or services, the second sub-system 704 may be configured in any suitable manner to perform the operations as described below. In one embodiment, the one or more devices encompassing sub-system 704 is an offline device, walled off and not interconnect to a separate network such the Internet. The device 704 may be a single device or a device be made up of multiple secure interconnected servers. Sub-system 704 is also referred to herein as device 704 and used interchangeably to describe the same device.

The digital signing service 720 digitally signs transactions and/or data using private keys (e.g., private keys associated with electronic accounts or wallets). The encryption/decryption service 730 may encrypt or decrypt data using one or more encryption/decryption standards (e.g., AES 128-bit, 192-bit, 256-bit; 3DES; Twofish 128-bit to 256-bit; RSA 1024-bit, 2048-bit), and may use any suitable encryption program or process such as GPG, PGP, OpenPGP). In one embodiment, the encryption/decryption service 730 is a Hardware Security Model (HSM) encryption/decryption service which provides a tamper-resistant hardware architecture that allows cryptographic operations (encryption, decryption) while keeping the cryptographic key within its hardware boundary. While depicted as two separate devices or services, the digital signing service 720 and the encryption/decryption service 730 may be combined into a single service and/or device.

Figure 8:
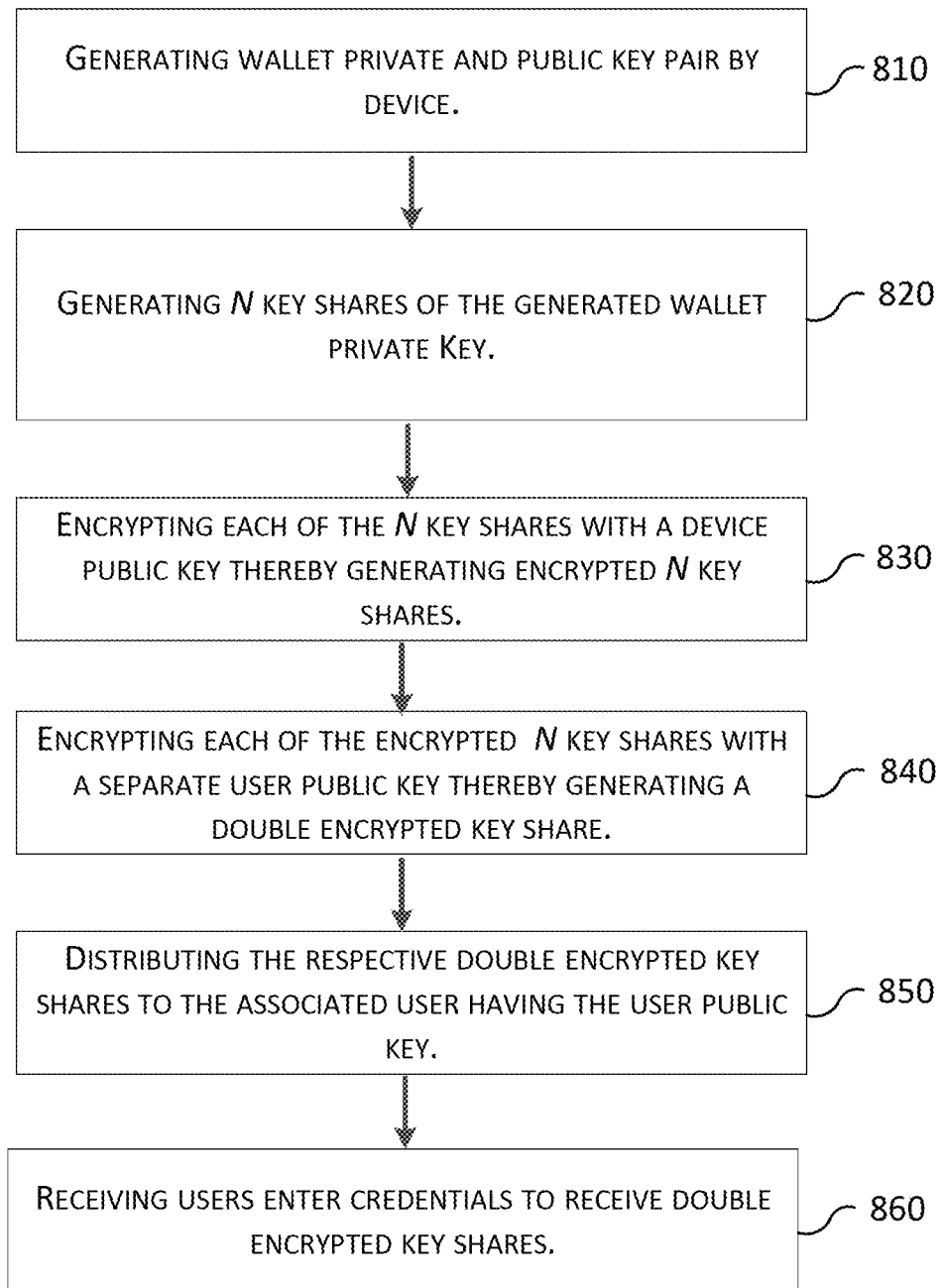
FIG. 8 illustrates a flowchart of an example process for generating secured encrypted private keys.

FIG. 8 illustrates a flowchart of an example process for generating secured encrypted private keys. The system 700 via device 704 generates a wallet private key and public key pair (block 810). The public key may serve as a wallet or account identifier and/or the device 704 may generate a separate account or wallet identifier and associate the public key to the generated identifier. The device 704 may receive a request for example, via a user interface or other input mechanism, to generate a new wallet private key. In response to the request, the device 704 generates a new private wallet key having a public and private key pair. The device 704 associates the wallet private key with an electronic wallet and/or other electronic account. The wallet private key is used for accessing and conducting transactions for the associated electronic wallet or account.

The system 700 via the device 704 then generates N key shares of the wallet private key (block 820). In one embodiment, the device 704 uses Shamir's secret sharing technique (as previously described above) to create N key shares. For example, the device 704 may set a predetermined number of 5 users that form the pool of total users that may receive a key share of the wallet private key. The device 704 may set a quorum (i.e., a required minimum number of key shares) of the 5 users that are needed to reassemble the wallet private key.

The device 704 then encrypts (e.g., using an encryption program such as GPG, PGP, OpenPGP, or other suitable encryption program) each of the generated N key shares of the wallet private key with a public key (of a public/private key pair) associated with the device 704 (block 830) that created the wallet private key. The device's 704 encryption of the N key shares of the wallet private key, thereby creates N encrypted key shares of the wallet private key, and provides a first level of encryption. Since the N key shares are encrypted with the public key of the device 704, then only a private key of the device 704 may decrypt the respective N key shares. Moreover, because Shamir's secret technique is employed, a pre-determined number (e.g., quorum) of the N key shares are also needed by the device 704 to recreate the wallet private key. At this point, the original generated wallet private key has been divided into multiple key shares and the key shares have each been encrypted at a first level of encryption using the public key of the device 704 that generated the wallet private key.

The device 704 then encrypts (using an encryption program such as GPG, PGP, OpenPGP, or other suitable encryption program) the encrypted key shares with a public key associated with the respective N users that will receive an encrypted key share of the wallet private key. At this point, the key shares now are encrypted at a second level of encryption with a unique encrypted key share for each of the respective N designated users. For example, the device 704 may store a list of public keys for the respective N users that may be designated to receive an encrypted key share. Additionally, the device 704 may receive via a user interface, or other input mechanism, each of the user public keys that will be used to double encrypt the single encrypted key shares. The device 704 may communicate with another interconnected data storage device 750 via a communications link 745 and may store the double encrypted keys shares along with an identifier of the user associated with the respective encrypted key shares. Communication by the digital signing service with the interconnected data storage device 750 is within an isolated network and is not connected to another external local or wide area networks, for example that are accessible via the Internet. In other words, while the digital signing service 720 may communicate over communications link 725 with the encrypt/decryption service 730, and may communicate over communication link 745 with the data storage service 750, the services 720, 730, 750 are isolated and form a restricted network, both physically and wirelessly separate from other networks.

The generated group of N double encrypted key shares may be obtained from the device 704 and provided to another separate service 740 of the system 700 which will transmit the double encrypted key shares to the respective N users (block 850). For example, a trusted user (who ideally is not an N user, but could be) may physically obtain from the device 704 the generated group of N double encrypted keys and provide the double encrypted keys to the intermediary service 740 that will send the double encrypted keys to the respective N users. A client-side application of a client device 710 then may require that a receiving N user must enter in their respective credentials (e.g., user-id and password, and/or via a two-step authentication process) to receive their particular double encrypted key. Optionally, the N user may use a suitable decryption software or program of choice to decrypt the outer layer of encryption of the double encrypted key shares using the N user's private key of a PGP private/public key pair.

In one embodiment, the device 704 may be configured to determine a time period in which a key share must be distributed to its intended N user. A time period value may be included in a data file along with the encrypted N key share. For example, the device 704 may generate a date and time value in which the key share must be received by a receiving N user. The device 704 may be configured such that the device 704 determines a date and time value based on a system date and time of the device 704 and adds an allowable time period (e.g., a number of hours or days) for the N user to receive their key share. A time window for unlocking the key share may be set, for example, to 36 hours or 5 days from the time the key share was created. The device 704 would then set an appropriate expiration date and time as 36 hours or 5 days from the current system date and time, or the date and time when the key share was created. The time value in the data file could be obfuscated using some hash-value or routine, and/or could be encrypted using a public key value of a PGP public/key private key pair of the intermediary service 740.

Subsequently, an N user may try to decrypt, via a client-side application of the client device 710, their respective double encrypted key share. The client-side application may evaluate whether the double encrypted key share was obtained by the receiving user by or before the expiration date. For example, the client-device may send the encrypted data or hash file to the intermediary service 740 which would then decrypt the data file using the private key of the intermediary service 740 to obtain the expiration date and time. The intermediary service 740 may then determine if the double encrypted key share was obtained by the N user after the expiration date and time. If so, then intermediary service 740 may transmit a message or information to the client-side application indicating the key share was not distributed to the respective N user within the required distribution time period. The system 700 may subsequently prevent the respective N user that failed (for whatever reason) to receive their double encrypted key share within the allowable window of time, to validate or authorize any transactions.

Additionally, the client-side application may determine that an N user tried to unlock their respective double encrypted key shares (i.e., decrypt a first layer of encryption), but was unsuccessful in their attempt. This could indicate that the recipient tried to unlock another users' key share, or that the user forgot their credential information and failed in their attempt to decrypt the information. The client-side application may transmit a message or information to the intermediary service 740 that there was an attempt to decrypt a double encrypted key share by a particular N user and that the attempt was unsuccessful. The intermediary service 740 may be configured that in the event of detecting x (e.g., three) or more unsuccessful attempts to decrypt a user's double encrypted key share, that system 700 may prevent any subsequent validation or authorization of any transactions by any N users.

Figure 9:
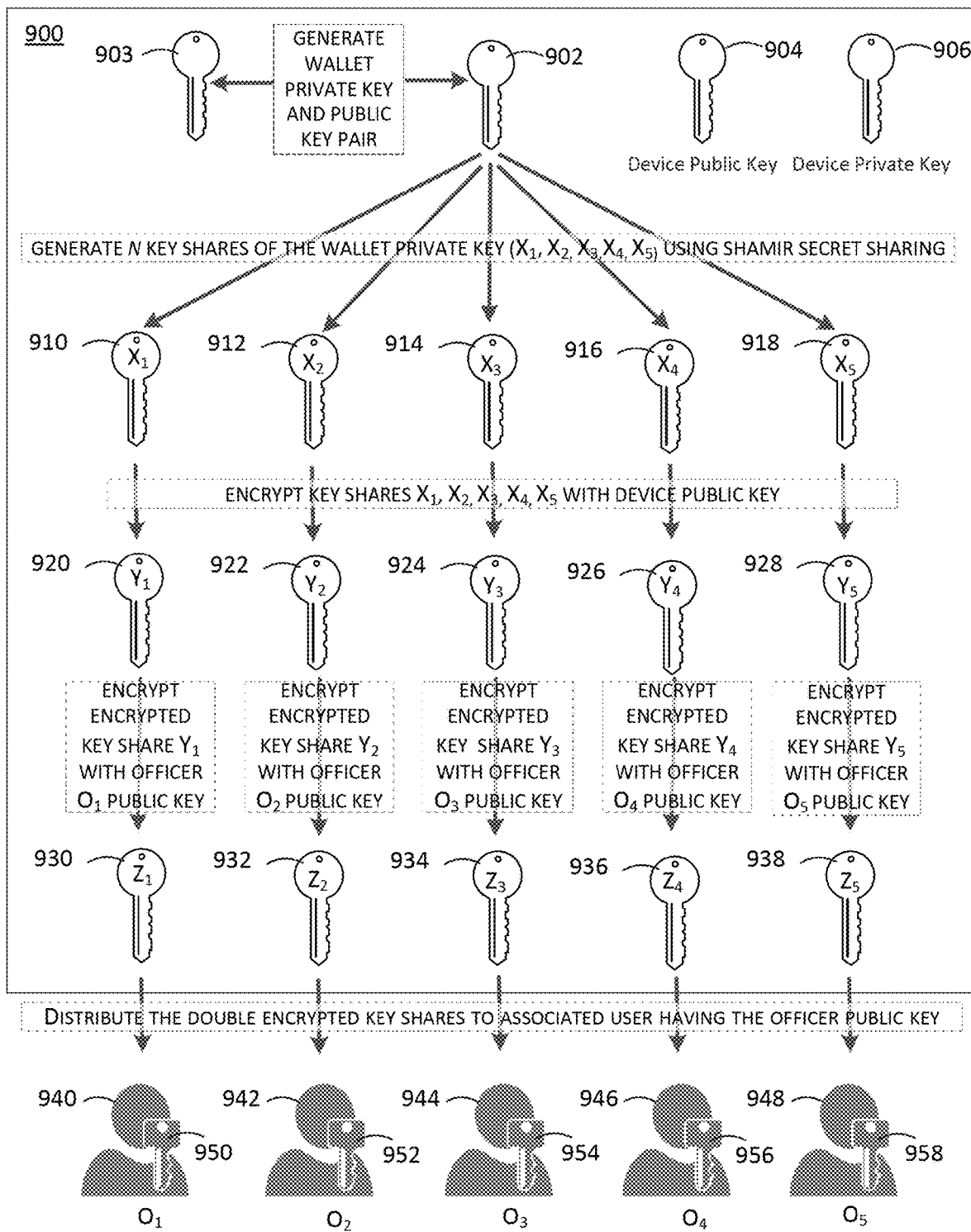
FIG. 9 illustrates an example diagram of the system generating a private key and using Shamir's Secret Sharing technique to encrypt multiple key shares.

FIG. 9 illustrates an example diagram of the system 700 generating a private key and using Shamir's Secret Sharing technique to encrypt multiple key shares. FIG. 9 further describes the flowchart of FIG. 8. Device 704 in FIG. 7 is represented as device 900 in FIG. 9. Upon receiving a system request, the device 900 generates a wallet private key 902 and public key pair. The device 900 has associated with it a public key 904 and private key 906 pair.

The device 900 generates a wallet private key 902 and public key 903 pair. The device 900 generates N key shares ($X_1, X_2, X_3, X_4, X_5$) 910, 912, 914, 916, 918 of the wallet private key 902. The device 900 generates the N key shares 910, 912, 914, 916, 918 using Shamir's secret sharing technique. The total number of key shares to be generated by the device 900 is a configurable parameter.

The device 900 then encrypts the N key shares ($X_1, X_2, X_3, X_4, X_5$) 910, 912, 914, 916, 918 with the device public key 904. The encryption of the N key shares may be performed by the device using an encryption program such as GPG, PGP, OpenPGP, or other suitable encryption program. The encryption of the N key shares generates a first level of encrypted key shares ($Y_1, Y_2, Y_3, Y_4, Y_5$) 920, 922, 924, 926, 928.

The device 900 then encrypts the respective first level encrypted key shares ($Y_1, Y_2, Y_3, Y_4, Y_5$) 920, 922, 924, 926, 928 with a specific user's public key. For example, 5 users ($O_1, O_2, O_3, O_4, O_5$) 940, 942, 944, 946, 948 each have a respective public key (of a public/private key pair) 950, 952, 954, 956, 958. The device 900 may retrieve from a local data store or memory cache, or receive via user input, the public keys associated with the 5 users 940, 942, 944, 946, 948. The encryption of the first level encrypted key shares 20, 922, 924, 926, 928 may be performed by the device 900 using an encryption program such as GPG, PGP, OpenPGP, or other suitable encryption program. The result of this next layer of encryption is the generation of double encrypted private key shares ($Z_1, Z_2, Z_3, Z_4, Z_5$) 930, 932, 934, 936, 938.

The generated group of N double encrypted key shares ($Z_1, Z_2, Z_3, Z_4, Z_5$) 930, 932, 934, 936, 938 may then be obtained from the device 900 and provided to another separate service that transmits the double encrypted key shares to the respective N users (block 850). For example, a trusted user (who ideally is not an N user, but could be) may obtain from the device 900 the generated group of N double encrypted key shares and provide the double encrypted key shares 930, 932, 934, 936, 938 to another secondary service of the system 700 that will transmit the double encrypted keys to the respective N users. Alternatively, a user's double encrypted key share may be physically delivered to a respective N user 940, 942, 944, 946, 948. Additionally, the public key 903 (and any associated account or wallet identifier) may be obtained from the device 900 by the trusted user and provided to another separate service of the system 700 for initiating transactions associated with the electronic account or wallet. The device 900 may require that the trusted user enter an identifier and password and/or other credentials to access and interact with the device 900.

Figure 10:
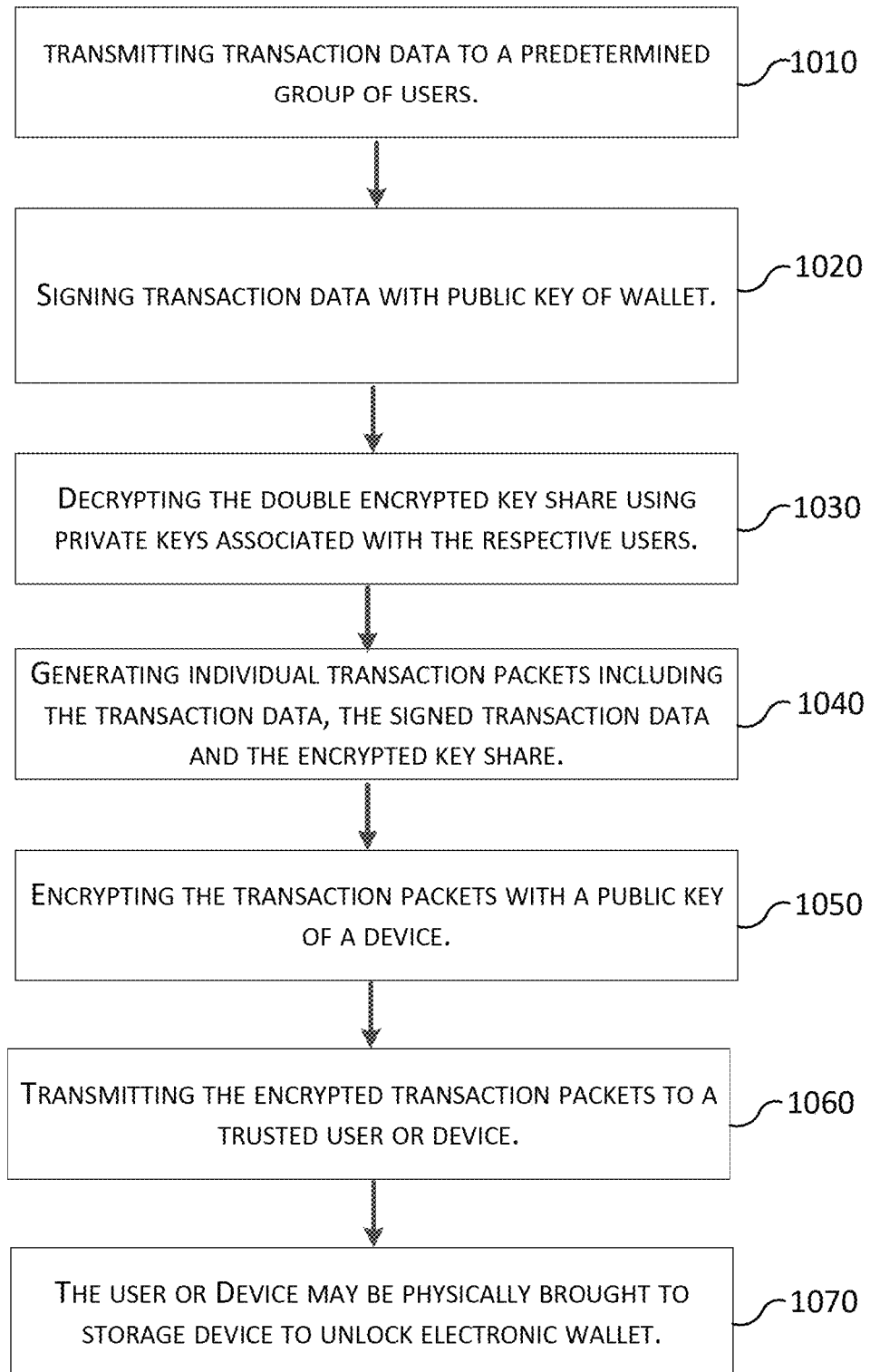
FIG. 10 illustrates a flowchart of an example process for securely processing a digital transaction.

FIG. 10 illustrates a flowchart of an example process for securely processing a digital transaction. This flowchart describes how the double encrypted key shares discussed in regard to FIGS. 8 and 9 are used to securely process and sign a digital transaction with a wallet private key. The digital transaction data may include an electronic account or wallet identifier and may include details about monies to be transferred.

A group of N users each receive electronic transaction data related to an electronic wallet or account (block 1010). For example, intermediary service 740, may receive a transaction from one or more client devices 710, or from some other external service (such as the transfer service 1200 depicted in FIG. 12). The intermediary service 740 may use a lookup or routing table to determine which N users should receive the digital transaction data for their approval. For example, the intermediary service 740 may cross-reference an electronic account, wallet identifier or public key associated with the wallet or account to a distribution list to identify those N users who are needed to approve the transaction.

The system 700 may have different groups of N users associated with different electronic wallets or accounts. For example, for a first account (e.g., account 123) the system 700 may require a first group of N users to approve transactions associated with the first account, while for a second account (e.g., account 345) the system 700 may require a second group of N users to approve transactions associated with the second account.

The intermediary service 740 signs the transaction data electronic with a public key of the electronic wallet associated with the transaction data (block 1020). Alternatively, the transaction data is received by the intermediary service 740 already having been signed with the public key of the electronic wallet associated with the transaction data. The intermediary service 740 may reference a lookup table based on an electronic account or wallet identifier to obtain the public key needed to sign the transaction data. The intermediary service 740 submits the transaction data to the respective N user, who then use a client-side application to approve the transaction. In addition, to submitting the transaction data to the respective N users, the intermediary service 740 may also transmit the value of the public key 904 of the device 704, 900 to the client-side application.

A client device 710 may generate or provide an application or user interface to an N user. The client-side application may be used by an N user to authorize a received transaction. The client-side application may be used to decrypt a second layer of encryption of the double encrypted key share (1030). Alternatively, an N user may use another application or software program to decrypt the second layer of encryption. For each of the N users receiving the digital transaction data, the client-side application requests the respective N users to authorize the transaction.

The client-side application prompts an N user to enter their user identification and password information and/or other security related credentials. As discussed previously, each of the N users, have in their possession or accessible to them, a double encrypted key share associated with a private key of a wallet or electronic account (i.e., having an inner and outer layer of encryption). To decrypt or unlock the outer layer of the double layer of encryption of the key share, the client-side application receives a user's security credentials which exposes the user's private key. The client-side application uses the exposed user private key to decrypt the outer layer of encryption of the double encrypted key share. This results in the obtaining the inner layer encrypted key share. The inner layer encrypted key share is in the form of one of (x) of (y) key shares that was originally encrypted with the public key of the device 704, 900 that generated the wallet private key.

The client-side application digitally signs the transaction and data with the private key of the N user. The client-side application may generate individual transaction packets which include information related to the transaction data, the signed transaction data and the inner encrypted key share (block 1040). The transaction packets may be in any suitable form or data structure to describe the transaction data, the signed transaction data, and the inner encrypted key share. For each of the N users, a separate transaction packet would be created by the client-side application at the time the N user authorizes the transaction.

The client-side application of the client device 710 encrypts the respective transaction packets with a public key of the device 704, 900 (block 1050). The client-side application uses the public key 904 of the device 704, 900 to encrypt the respective transaction packets using an encryption program such as GPG, PGP, OpenPGP, or other suitable encryption program.

Each client-side application of the client device(s) 710 transmits, for the respective N users, their encrypted transaction packets to the intermediary service 740. The transaction packets may include the original transaction and data, signed (i.e., with the N user private key) transaction and data, and the inner layer encrypted key share. The intermediary service 740 transmits via an electronic communications program, or makes available directly from the intermediary service 740, the encrypted transaction packets to a trusted user (block 1060). Ideally, the trusted user is a user that is different than one of the N users. The intermediary service 740 may generate an electronic notification to the trusted user when a quorum of required users has been reached such that the digital transaction is ready to be signed by the device 704, 900.

The system 700 may be configured such that the intermediary service 740 conveys limited information to the trusted user and not provide any details about the digital transaction itself, such as the wallet or electronic account identifier, or any amounts of monies to be transferred. A trusted user (who may be the same user or a different user than the original trusted user who originally received and distributed the double encrypted key shares) may access the intermediary service 740 and receive each of the respective separate transaction packets.

In one embodiment, the intermediary service 740 further encrypts the collection of transaction packets into one electronic file using the public key 904 of the device 704, 900. In this manner, the trusted user does not receive any indication of how many separate transaction packets have been received. In this embodiment, the trusted user receives only a single encrypted file. In another embodiment, the collection of transaction packets are transmitted to the device 704, 900 where the device decrypts and signs the transaction as described below.

The trusted user then physically transports and/or submits the separate encrypted transaction packets or the single encrypted file to the device 704, 900. The device 704, 900 receives the information from the trusted user, and then decrypts the respective transaction packets using the private key of the device 704, 900. This exposes the unencrypted separate key shares. The device 704 validates (e.g., using the public key of an N user) the digital signatures of each N user that signed a respective transaction packets to determine that the transaction data was indeed generated by the particular N user. As previously noted, transaction data is digitally signed with a private key of an N user. The device 704 stores the public keys for each of the N users and determines based on the public keys whether the transaction data was signed by one of the N users from the list. If the transaction data was not signed by a valid N user from the list, then the transaction will not be authorized. The device 70 may provide an indication of an invalid attempt to authorize a transaction.

For each of the transaction packets that are confirmed to be generated by the respective N users (e.g., via confirmation of their digital signature), then the device 704 proceeds to recreate a wallet private key using the encrypted key shares for each of the confirmed transaction packets. The device 704 decrypts the encrypted key share using the private key 906 of the device 704, 900. The device 704, 900 uses at least a quorum of the decrypted key shares to generate (i.e., recreate) the wallet private key. The device 704, 900 then digitally signs (i.e., authorizes) the digital transaction using the generated wallet private key. The signed digital transaction information is then made available by the device 704, 900 to the trusted user. The trusted user then may take the signed digital transaction to the intermediary service 740 to complete the transaction (such as transfer of monies from the related crypto currency account). For example, the intermediary service 740 may complete the transaction by broadcast the signed digital transaction to a bitcoin block chain.

Figure 11:
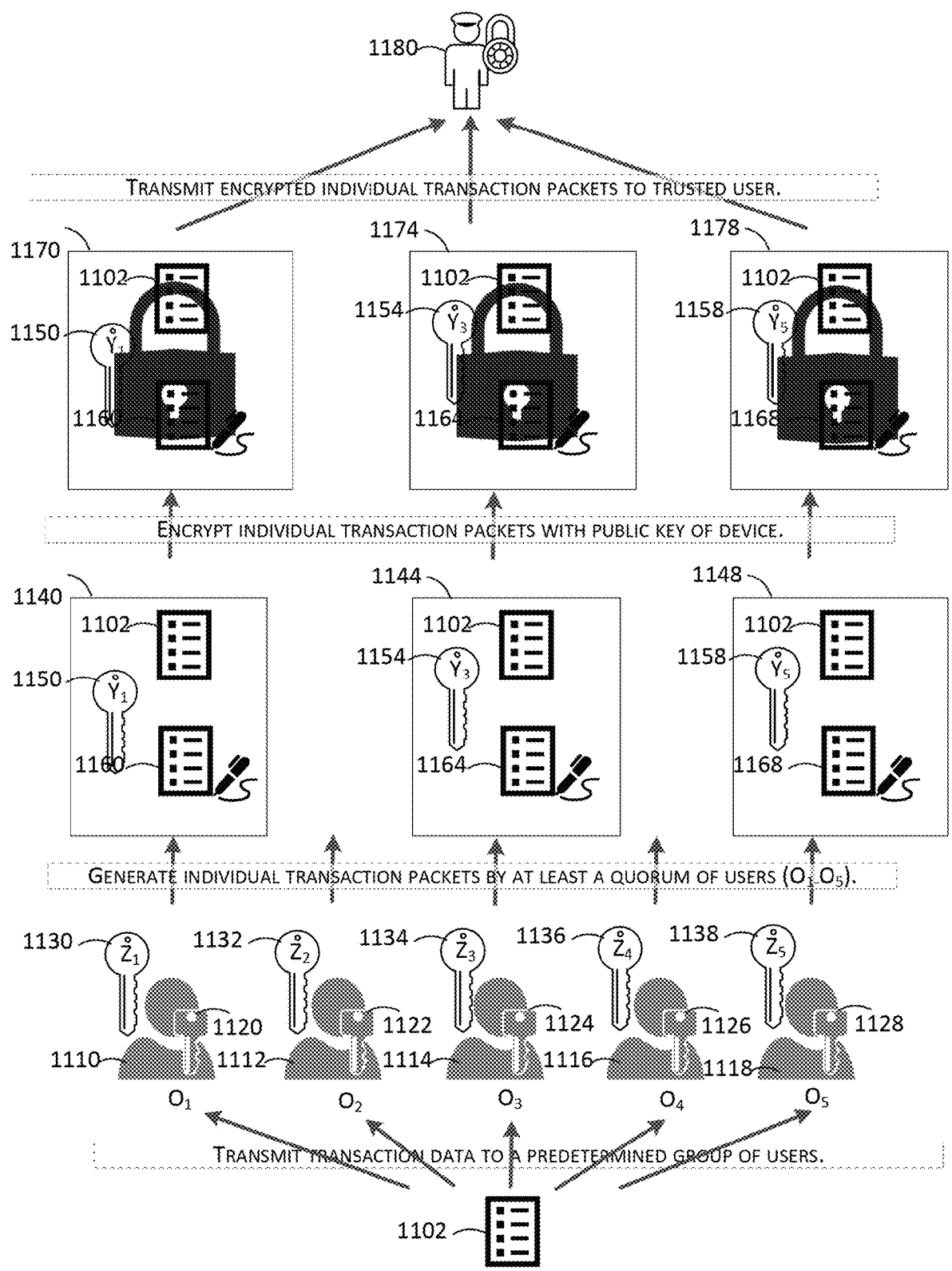
FIG. 11 illustrates an example diagram of the system securely processing a digital transaction.

FIG. 11 illustrates an example diagram of the system 700 processing a secured digital transaction related to an electronic wallet or electronic account. FIG. 11 further describes the flowchart of FIG. 10. The intermediary service 740 receives electronic transactions 1102 associated with an electronic wallet or account. The electronic transactions are sent from the intermediary service 740 to a client-side application operating on one or more client device(s) 710.

Via the client-side application, the respective users ($O_1$, $O_2$, $O_3$, $O_4$, $O_5$) 1110, 1112, 1114, 1116, 1118 each receive an indication that a transaction is to be approved. For example, the client device 710 may generate a user interface with which the respective users may interact with the system 700. The user interface may request user security credentials. The client-side application may obtain a user associated private key 1120, 1122, 1124, 1126, 1128 to decrypt a double encrypted key share ($Z_1$, $Z_2$, $Z_3$, $Z_4$, $Z_5$) 1130, 1132, 1134, 1136, 1138 that had been received by a respective user ($O_1$, $O_2$, $O_3$, $O_4$, $O_5$) 1110, 1112, 1114, 1116, 1118. The client-side application generates individual transaction packets 1140, 1144, 1148 for those users that have approved the transaction. The client-side application signs the transaction with the private key of the respective user ($O_1$, $O_2$, $O_3$, $O_4$, $O_5$). The transaction packets 1140, 1144, 1148 each include a respective single encrypted key share ($Z_1$, $Z_3$, $Z_5$) 1150, 1154, 1158, a copy of the digital transaction data 1102, and a digital signed copy of the transaction data 1160, 1164, 1168. For example, a transaction packet 1140, 1144, 1148 may include a copy of a transaction and the transaction data, and signed copy of the transaction and the transaction data (where the signed copy is signed with the private key of the respective user ($O_1$, $O_2$, $O_3$, $O_4$, $O_5$)).

The client-side application of the client device 710 then encrypts the transaction packets 1140, 1144, 1148 with a public key of the device 704, 900. This creates multiple encrypted transactions packets 1170, 1174, 1178. The client-side application transmits the transaction packets 1170, 1174, 1178 to the intermediary service 740 via communication link 735. While not shown, as previously indicated, the multiple encrypted transaction packets 1170, 1174, 1178 may be further encrypted by the intermediary service 740 using the public key of the device 704, 900 to generate a single encrypted file containing the multiple encrypted transaction packets 1170, 1174, 1178. The intermediary service 740 then allows a trusted user 1180 to obtain the encrypted transaction packets or the single encrypted file containing the multiple encrypted transaction packets 1170, 1174, 1178.

The trusted user 1180 then provides the encrypted transaction packets to the device 704, 900. The device 704, 900 uses its private key 906 to decrypt the transaction packets 1170, 1174, 1178 to obtain the respective key shares for the wallet private key associated with the electronic wallet or account.

As noted above, the device 704 validates the digital signatures of each N user that signed the transaction and data to determine that the transaction and data was indeed generated by a particular N user. If the transaction packet was not signed by a valid N user from the list, then the transaction will not be authorized. The device 70 may provide an indication of an invalid attempt to authorize a transaction.

When the digital signatures of each N user have been validated, and if the device 704, 900 has received the minimum required number of key shares (e.g., a predetermined quorum of key shares), then the device 704, 900 may generate the wallet private key using the key shares according to Shamir's secret sharing technique. The device 704 uses the obtained key shares to recreate the wallet private key. The device 704, 900 then uses the wallet private key to digitally sign the transaction, thereby creating signed valid transaction data. The device 704, 900 may delete from store and/or wipe from memory the wallet private key. The device 704, 900 may store information about the signed valid transaction data on the data storage service 750. However, the actual wallet private key would not be stored.

The signed valid transaction data is then made available by the device 704, 900 to the trusted user. The trusted user obtains a copy of the signed valid transaction data and provides the signed valid transaction data to the intermediary service 740 which completes the transaction, for example, by broadcasting the signed transaction data to a crypto currency/blockchain network.

Optionally, the device 704, 900 may be configured to encrypt the signed valid transaction data using a public key of the intermediary service 740. In this embodiment, the device 740 stores in memory or on a storage device, a public key of the intermediary service 740 and uses the public key of the intermediary service to encrypt the signed valid transaction data. The intermediary service 740 would have an associated public/private PGP key pair. The trusted user may then retrieve the encrypted signed valid transaction data from the device 704, 900. The trusted user uploads the encrypted signed valid transaction data to the intermediary service 740. The intermediary service 740 would use its private key pair to decrypt the encrypted signed valid transaction data. This additional encryption and decryption step provides a further level of approval/security so that the trusted user does not have access to unencrypted signed valid transaction data. Moreover, in the case of any failure of security measures and a fraudulent transaction was created and signed, the transaction would still not be broadcast as the transaction is transmitted by the intermediary service. The intermediary service 740 may complete the transaction, for example, by broadcasting the unencrypted signed transaction data to a crypto currency/blockchain network.

Figure 12:
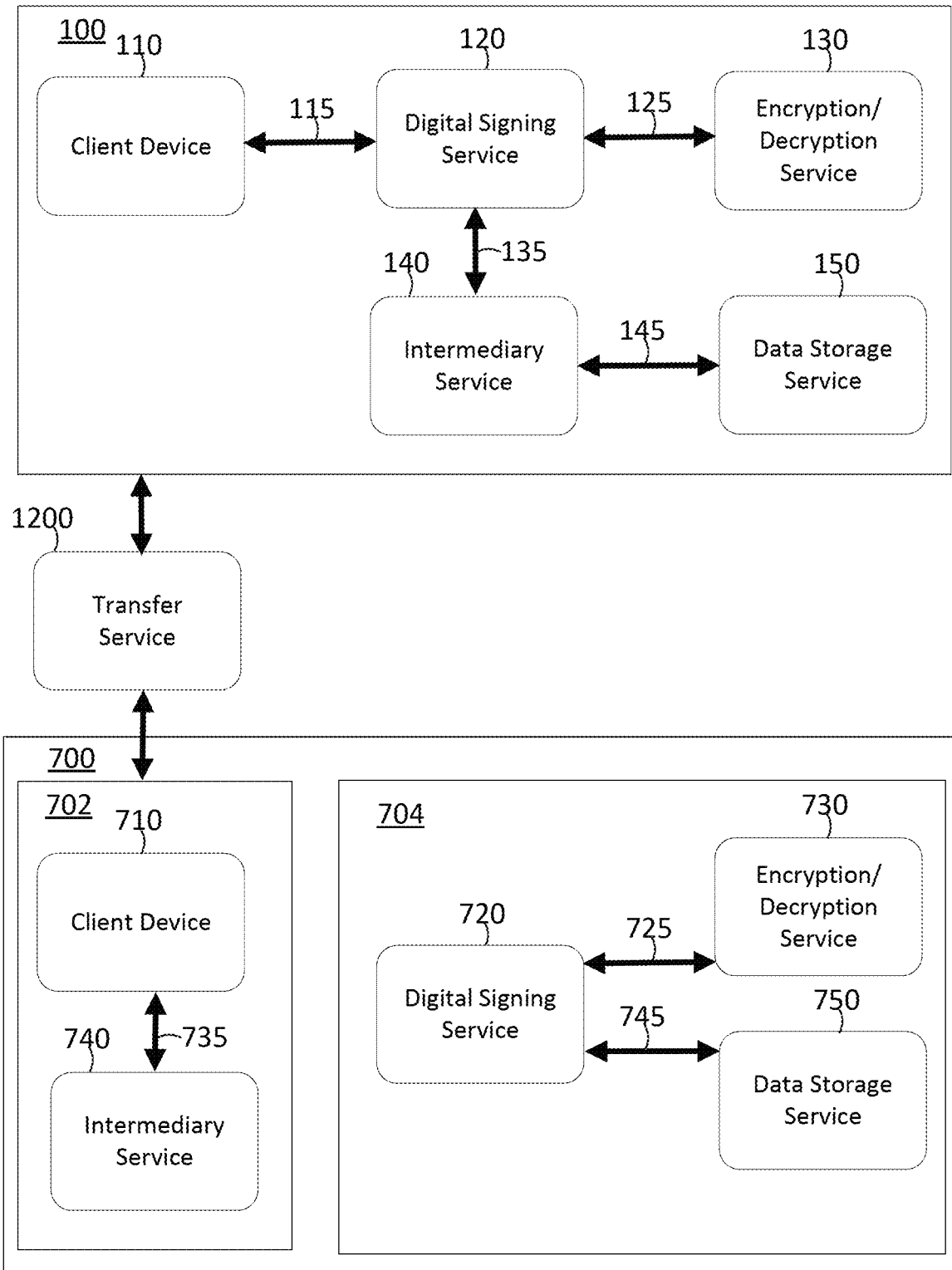
FIG. 12 illustrates an example system architecture for combining the architecture depicted in FIG. 1 and FIG. 7.

FIG. 12 illustrates an example system architecture for combining the architecture depicted in FIG. 1 and FIG. 7. The systems 100, 700 may be combined using a transfer service 1200. The transfer service 1200 provides a gateway to transfer monies associated with electronic accounts managed by the first system 100, and the monies associated with electronic accounts managed by the second system 700. The transfer service may receive a request from either system 100, 700 and transfer monies to wallets as described for the respective systems.

While the foregoing disclosure describes N key shares generated by the systems 100, 700, 900 using Shamir's secret sharing technique, the systems 100, 700, 900 may generate N(M) key shares for a respective N key share. For example, the system 100, 700, 900 may generate 5 key shares. Of those 5 key shares, the system 100, 700, 900 may further shard (e.g., divide) one or more of the 5 key shares into sub-key shares and use the encryption techniques described herein to encrypt the sub-key shares. As an implementation then, a quorum of 2 or more users having child sub-key shares may be required to "unlock" a parent key share. Sub-sharding one or more N key shares then requires groups of M sub-users to collectively "unlock" a parent N key share. For each of the N key shares, the required number of M sub-users may be 0, 1, 2 or more.

Figure 13:
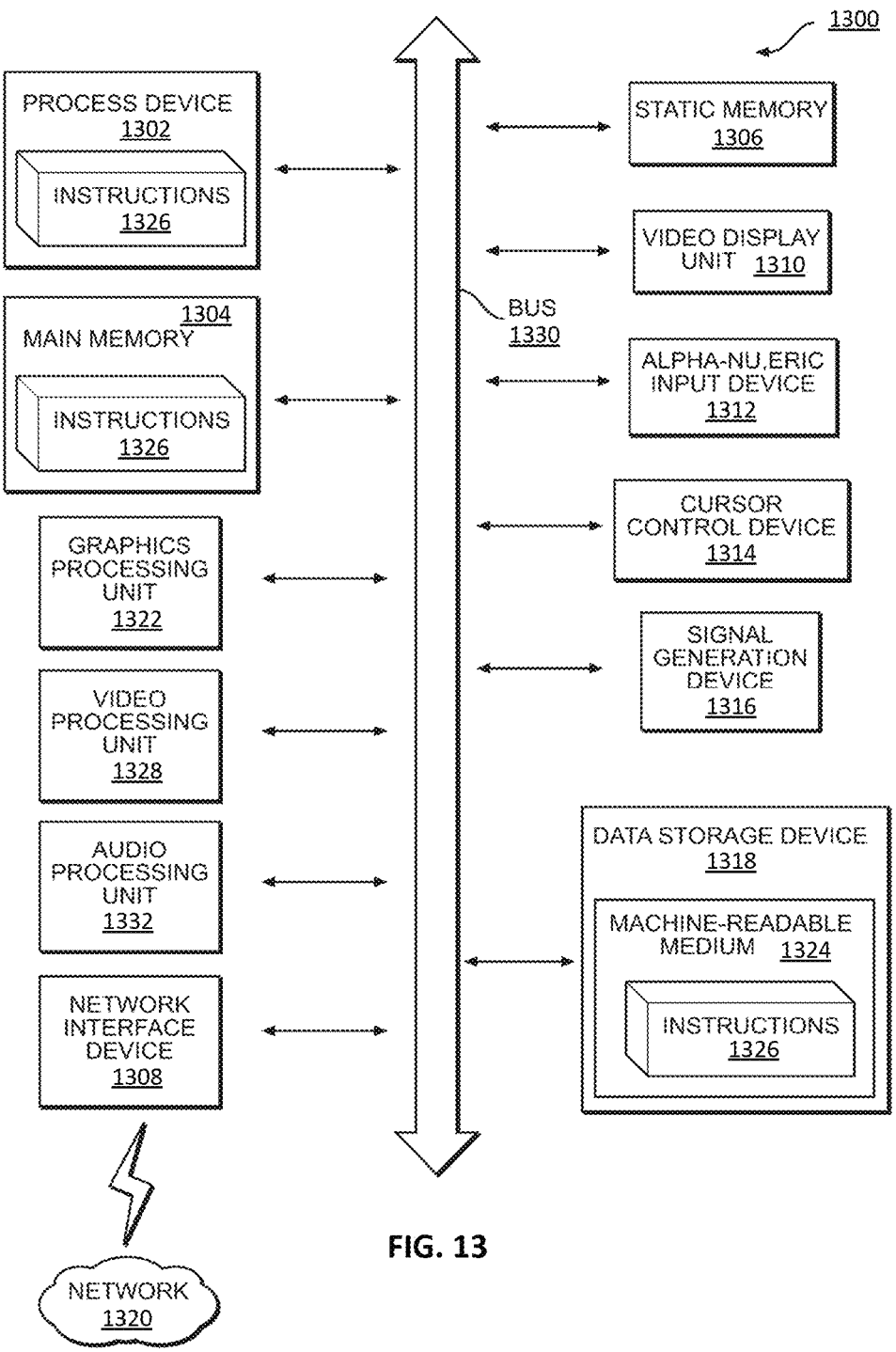
FIG. 13 illustrates an example machine of the computer system.

FIG. 13 illustrates an example machine of a computer system within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 1300 includes a processing device 1302, a main memory 1304 (e.g., read-only memory (ROM), flash memory, dynamic random access memory (DRAM) such as synchronous DRAM (SDRAM) or Rambus DRAM (RDRAM), etc.), a static memory 1306 (e.g., flash memory, static random access memory (SRAM), etc.), and a data storage device 1318, which communicate with each other via a bus 1330.

Processing device 702 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 1302 may also be one or more special-purpose processing devices such as an application specific integrated circuit (ASIC), a field programmable gate array (FPGA), a digital signal processor (DSP), network processor, or the like. The processing device 1302 is configured to execute instructions 1326 for performing the operations and steps discussed herein.

The computer system 1300 may further include a network interface device 1308 to communicate over the network 1320. The computer system 1300 also may include a video display unit 1310 (e.g., a liquid crystal display (LCD) or a cathode ray tube (CRT)), an alphanumeric input device 1312 (e.g., a keyboard), a cursor control device 1314 (e.g., a mouse), a graphics processing unit 1322, a signal generation device 1316 (e.g., a speaker), graphics processing unit 1322, video processing unit 1328, and audio processing unit 1332.

The data storage device 1318 may include a machine-readable storage medium 1324 (also known as a computer-readable medium) on which is stored one or more sets of instructions or software 1326 embodying any one or more of the methodologies or functions described herein. The instructions 1326 may also reside, completely or at least partially, within the main memory 1304 and/or within the processing device 1302 during execution thereof by the computer system 1300, the main memory 1304 and the processing device 1302 also constituting machine-readable storage media.

In one implementation, the instructions 1326 include instructions to implement functionality corresponding to the components of a device to perform the disclosure herein. While the machine-readable storage medium 1324 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Various general purpose systems may be used with programs in accordance with the teachings herein, or it may prove convenient to construct a more specialized apparatus to perform the method. The structure for a variety of these systems will appear as set forth in the description above. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. The disclosure and drawings are, accordingly, to be regarded in an illustrative sense rather than a restrictive sense.

What is claimed is:

1. A system comprising one or more processors, and a non-transitory computer-readable medium including one or more sequences of instructions that, when executed by the one or more processors, cause the system to perform operations comprising:
   storing multiple encrypted private keys in a memory cache accessible by a primary device, each encrypted private key being associated with a separate electronic account, wherein the multiple encrypted private keys are each encrypted in the Advanced Encryption Standard with a 256-bit key;
   receiving from a requesting secondary device an electronic transaction associated with a first electronic account, the requesting secondary device being separate from the primary device;
   identifying a particular encrypted private key from the stored multiple encrypted private keys that is associated with the first electronic account, the encrypted private key being selected from one of the multiple encrypted private keys stored in the memory cache;
   decrypting the identified encrypted private key by providing the identified encrypted private key to a decrypting service and receiving from the decrypting service an unencrypted private key associated with the identified encrypted private key;
   digitally signing the electronic transaction based on the unencrypted private key; and
   transmitting the digitally signed electronic transaction to the requesting secondary device.

2. The system of claim 1, wherein the primary device temporarily stores the unencrypted private key in the memory cache, and then after digitally signing the electronic transaction permanently wiping the unencrypted private key from the memory cache.

3. The system of claim 1, further comprising the operations of:
   receiving an unencrypted private key from a tertiary device, the tertiary device being separate from the primary device and the secondary device;
   encrypting the unencrypted private key by transmitting the unencrypted private key to an encrypting service and receiving from the encrypting service a newly encrypted private key associated with the unencrypted private key; and
   storing the newly encrypted private key in the primary cache of the primary device.

4. The system of claim 3, further comprising the operations of:
   transmitting the newly encrypted private key to a data storage service, wherein the data storage service is configured to encrypt and store the newly encrypted private key using Shamir's secret sharing technique.

5. The system of claim 1, wherein the encrypted private keys each have an associated index value that uniquely identifies the encrypted private key, and wherein the index value is stored in the memory cache for association with the encrypted private key.

6. The system of claim 1, wherein the first electronic account is an electronic wallet, and the electronic transaction comprises a request to transmit a monetary value of digital currency from the electronic wallet to a public address of a second electronic wallet, and wherein the first electronic wallet has an associated unencrypted private key.

7. A method implemented by a system comprising one or more processors, the method comprising:
   storing multiple encrypted private keys in a memory cache accessible by a primary device, each encrypted private key being associated with a separate electronic account, wherein the multiple encrypted private keys are each encrypted in the Advanced Encryption Standard with a 256-bit key;
   receiving from a requesting secondary device an electronic transaction associated with a first electronic account, the requesting secondary device being separate from the primary device;
   identifying a particular encrypted private key from the stored multiple encrypted private keys that is associated with the first electronic account, the encrypted private key being selected from one of the multiple encrypted private keys stored in the memory cache;
   decrypting the identified encrypted private key by providing the identified encrypted private key to a decrypting service and receiving from the decrypting service an unencrypted private key associated with the identified encrypted private key;
   digitally signing the electronic transaction based on the unencrypted private key; and
   transmitting the digitally signed electronic transaction to the requesting secondary device.

8. The method of claim 7, wherein the primary device temporarily stores the unencrypted private key in the memory cache, and then after digitally signing the electronic transaction permanently wiping the unencrypted private key from the memory cache.

9. The method of claim 7, further comprising the operations of:
   receiving an unencrypted private key from a tertiary device, the tertiary device being separate from the primary device and the secondary device;
   encrypting the unencrypted private key by transmitting the unencrypted private key to an encrypting service and receiving from the encrypting service a newly encrypted private key associated with the unencrypted private key; and
   storing the newly encrypted private key in the primary cache of the primary device.

10. The method of claim 9, further comprising the operations of:
    transmitting the newly encrypted private key to a data storage service, wherein the data storage service is configured to encrypt and store the newly encrypted private key using Shamir's secret sharing technique.

11. The method of claim 7, wherein the encrypted private keys each have an associated index value that uniquely identifies the encrypted private key, and wherein the index value is stored in the memory cache for association with the encrypted private key.

12. The method of claim 7, wherein the first electronic account is an electronic wallet, and the electronic transaction comprises a request to transmit a monetary value of digital currency from the electronic wallet to a public address of a second electronic wallet, and wherein the first electronic wallet has an associated unencrypted private key.

13. A non-transitory computer storage medium comprising instructions that when executed by a system comprising one or more processors, cause the one or more processors to perform operations comprising:
   storing multiple encrypted private keys in a memory cache accessible by a primary device, each encrypted private key being associated with a separate electronic account, wherein the multiple encrypted private keys are each encrypted in the Advanced Encryption Standard with a 256-bit key;
   receiving from a requesting secondary device an electronic transaction associated with a first electronic account, the requesting secondary device being separate from the primary device;
   identifying a particular encrypted private key from the stored multiple encrypted private keys that is associated with the first electronic account, the encrypted private key being selected from one of the multiple encrypted private keys stored in the memory cache;
   decrypting the identified encrypted private key by providing the identified encrypted private key to a decrypting service and receiving from the decrypting service an unencrypted private key associated with the identified encrypted private key;
   digitally signing the electronic transaction based on the unencrypted private key; and
   transmitting the digitally signed electronic transaction to the requesting secondary device.

14. The non-transitory computer storage medium of claim 13, wherein the primary device temporarily stores the unencrypted private key in the memory cache, and then after digitally signing the electronic transaction permanently wiping the unencrypted private key from the memory cache.

15. The non-transitory computer storage medium of claim 13, further comprising the operations of:
   receiving an unencrypted private key from a tertiary device, the tertiary device being separate from the primary device and the secondary device;
   encrypting the unencrypted private key by transmitting the unencrypted private key to an encrypting service and receiving from the encrypting service a newly encrypted private key associated with the unencrypted private key; and
   storing the newly encrypted private key in the primary cache of the primary device.

16. The non-transitory computer storage medium of claim 15, further comprising the operations of:
   transmitting the newly encrypted private key to a data storage service, wherein the data storage service is configured to encrypt and store the newly encrypted private key using Shamir's secret sharing technique.

17. The non-transitory computer storage medium of claim 13, wherein the encrypted private keys each have an associated index value that uniquely identifies the encrypted private key, and wherein the index value is stored in the memory cache for association with the encrypted private key.

18. The non-transitory computer storage medium of claim 13, wherein the first electronic account is an electronic wallet, and the electronic transaction comprises a request to transmit a monetary value of digital currency from the electronic wallet to a public address of a second electronic wallet, and wherein the first electronic wallet has an associated unencrypted private key.

* * * * *